US011076717B2

(12) United States Patent
    Glucksman

(10) Patent No.: US 11,076,717 B2
(45) Date of Patent: Aug. 3, 2021

(54) COUNTER TOP COOKING APPLIANCE

(71) Applicant: Dov Z. Glucksman, Winchester, MA (US)

(72) Inventor: Dov Z. Glucksman, Winchester, MA (US)

(*) Notice: Subject to any disclaimer, the term of this patent is extended or adjusted under 35 U.S.C. 154(b) by 154 days.

(21) Appl. No.: 16/690,730

(22) Filed: Nov. 21, 2019

(65) Prior Publication Data
US 2020/0093329 A1    Mar. 26, 2020

Related U.S. Application Data

(63) Continuation-in-part of application No. 15/078,933, filed on Mar. 23, 2016, now Pat. No. 10,485,377.

(60) Provisional application No. 62/136,853, filed on Mar. 23, 2015.

(51) Int. Cl.
    *A47J 37/04*    (2006.01)
    *F24C 15/16*    (2006.01)

(52) U.S. Cl.
    CPC .......... *A47J 37/041* (2013.01); *F24C 15/164* (2013.01)

(58) Field of Classification Search
    CPC .... A47J 37/042; A47J 37/0623; A47J 37/041; A47J 37/0664; A47J 37/0745; A47J 37/043; A47J 37/0629; A47J 37/0641; A47J 36/06; A47J 37/047; A47J 37/0635; A47J 37/0709; A47J 27/62; A47J 37/049
    USPC ......... 99/339, 427, 419, 446, 447, 400, 451, 99/327, 331, 335, 342, 450, 476, 482, 99/349, 353, 401, 444, 448, 479
    See application file for complete search history.

(56) References Cited

U.S. PATENT DOCUMENTS

| | | | |
|---|---|---|---|
| 2,588,046 A | 3/1952 | Ridgely | |
| 6,076,453 A * | 6/2000 | Hsu | A47J 37/041 99/419 |
| 6,142,064 A * | 11/2000 | Backus | A47J 37/041 126/190 |
| 6,173,645 B1 * | 1/2001 | Backus | A47J 37/041 220/326 |
| 6,240,838 B1 * | 6/2001 | Backus | A47J 37/041 99/419 |
| 6,250,214 B1 * | 6/2001 | Backus | A47J 37/041 99/419 |
| 6,253,665 B1 * | 7/2001 | Backus | A47J 37/041 99/419 |
| 6,450,087 B2 * | 9/2002 | Backus | A47J 37/041 99/421 H |
| 6,561,083 B2 * | 5/2003 | Hsu | A47J 37/041 99/421 H |
| 6,658,991 B2 * | 12/2003 | Backus | A47J 37/041 99/395 |

(Continued)

*Primary Examiner* — Ibrahime A Abraham
*Assistant Examiner* — Chris Q Liu
(74) *Attorney, Agent, or Firm* — Frank Marino

(57) ABSTRACT

A countertop electric appliance optimally performs a variety of cooking modes with both radiant and convective heat sources as well as control means for controlling the timing and intensity of the heat sources. A driver turns food about either a horizontal or a vertical axis of rotation suitable for the specific food and recipe. A hinged door supports the food to be cooked so that in one location the food is caused to be turned by the drive means and in another location the food is loaded into or removed from the appliance, external of the cooking compartment, to be easily handled by the operator.

19 Claims, 28 Drawing Sheets

(56) References Cited

U.S. PATENT DOCUMENTS

| | | | | |
|---|---|---|---|---|
| 6,965,095 B1* | 11/2005 | Popeil | ............ | A47J 37/042 |
| | | | | 219/403 |
| 6,988,445 B1* | 1/2006 | Backus | ............ | A47J 37/042 |
| | | | | 99/421 H |
| 8,017,167 B2* | 9/2011 | Backus | ............ | A47J 37/042 |
| | | | | 426/523 |
| 2014/0216271 A1 | 8/2014 | Arling et al. | | |
| 2016/0309956 A1* | 10/2016 | Glucksman | ............ | A47J 37/047 |

* cited by examiner

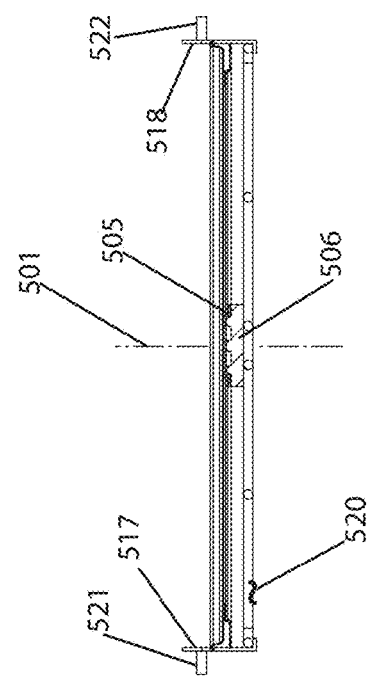
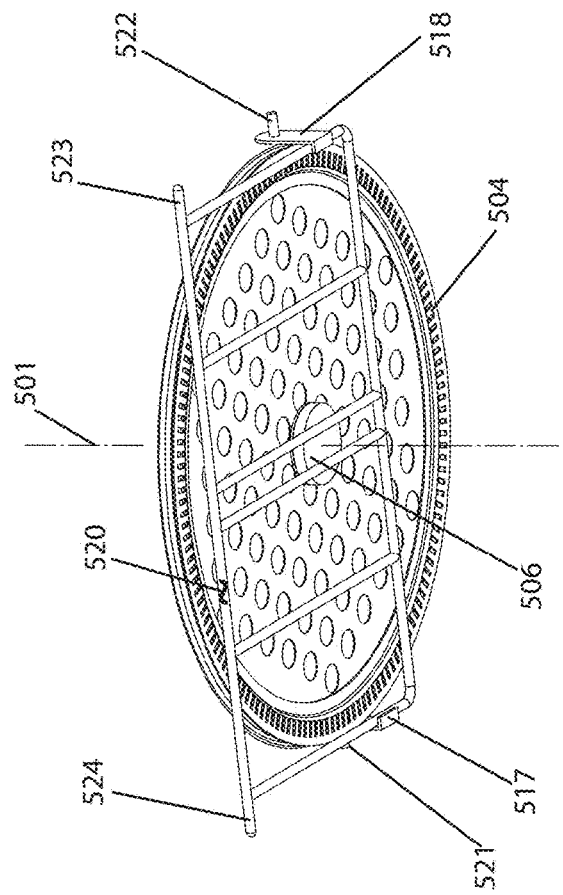
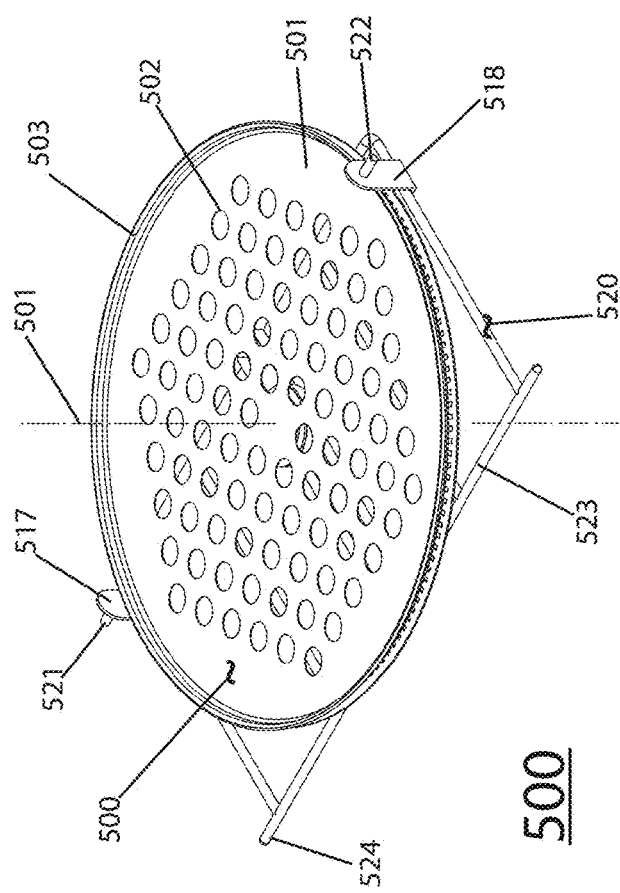
Fig. 6A
Fig. 6B
Fig. 6C

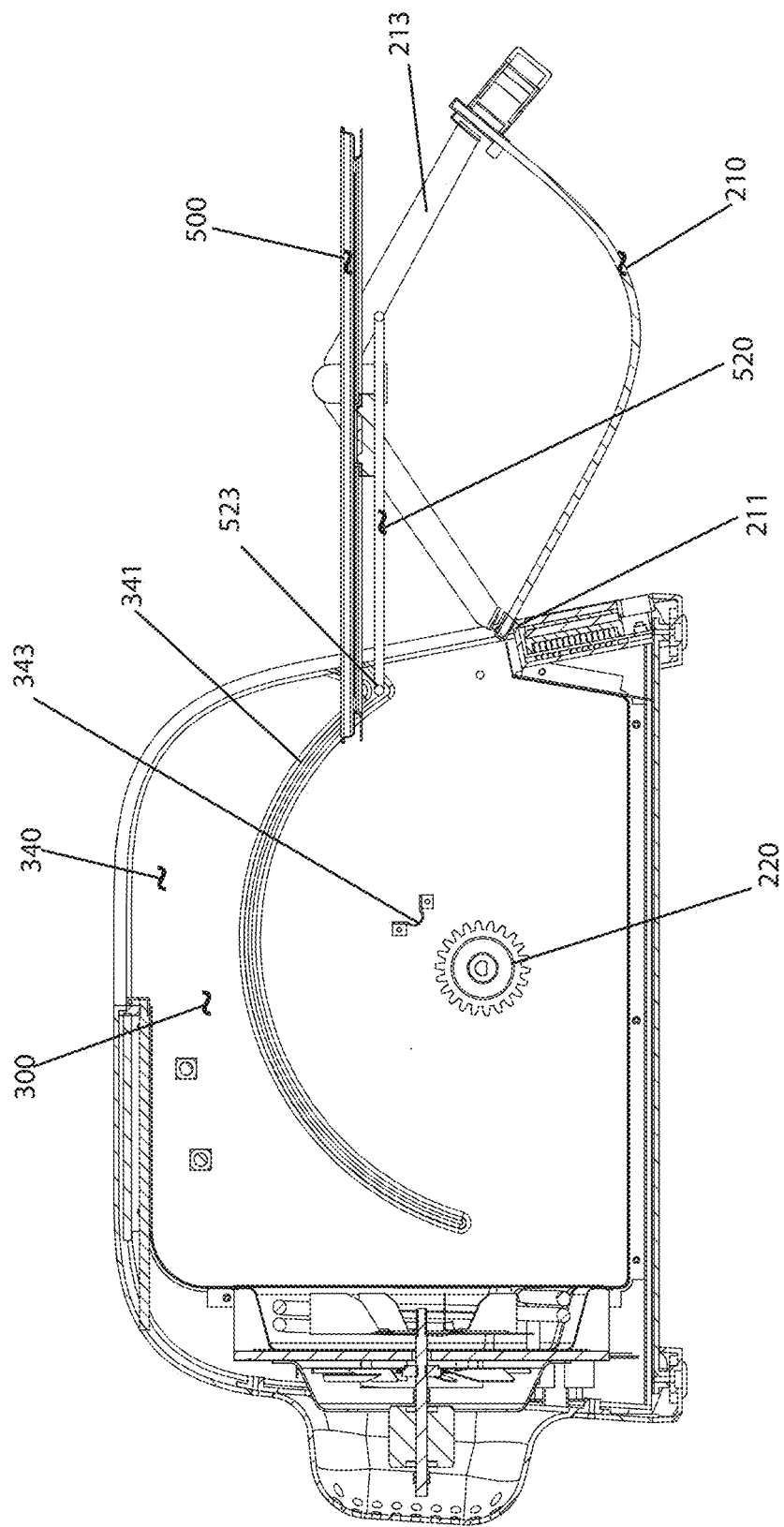

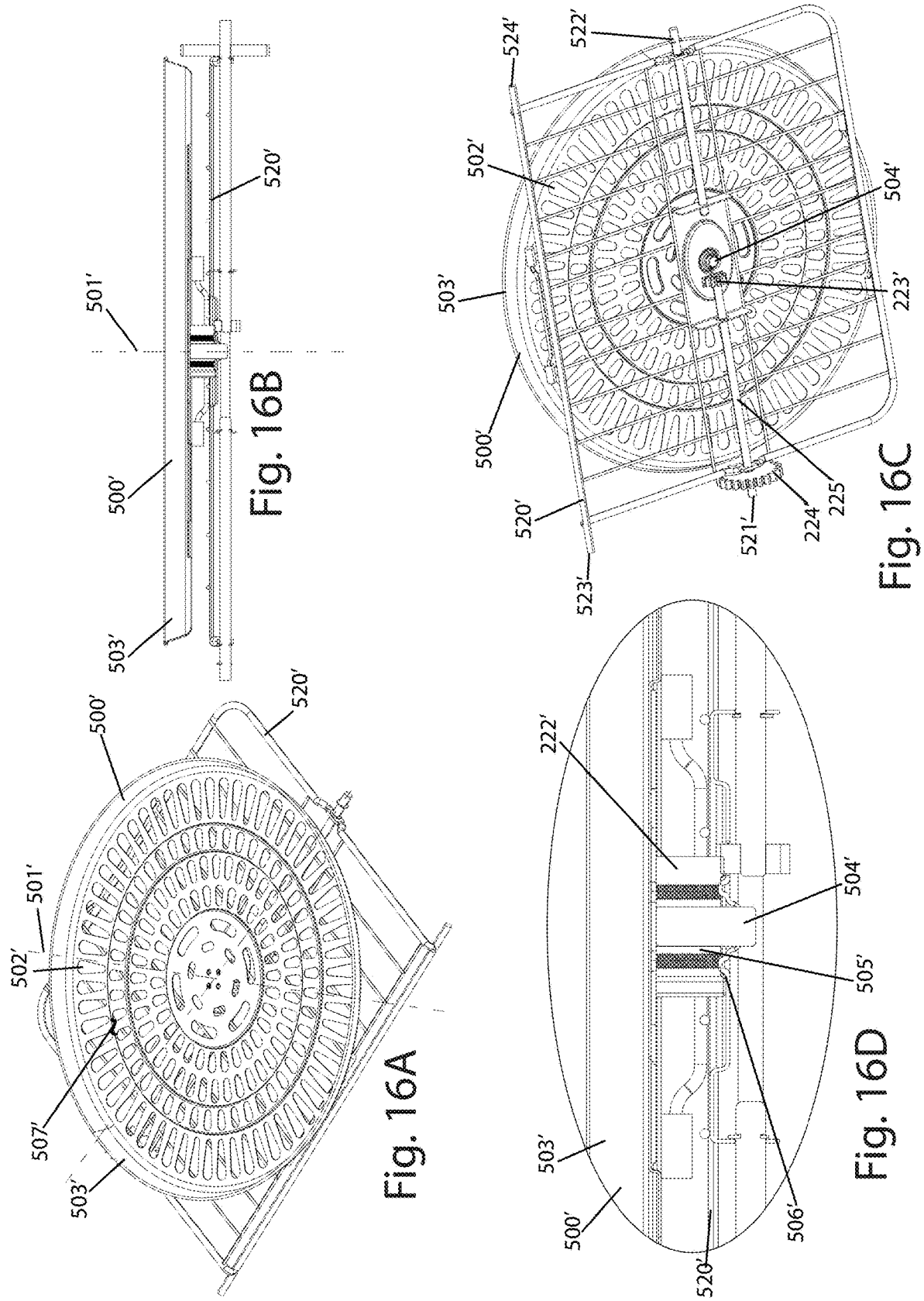

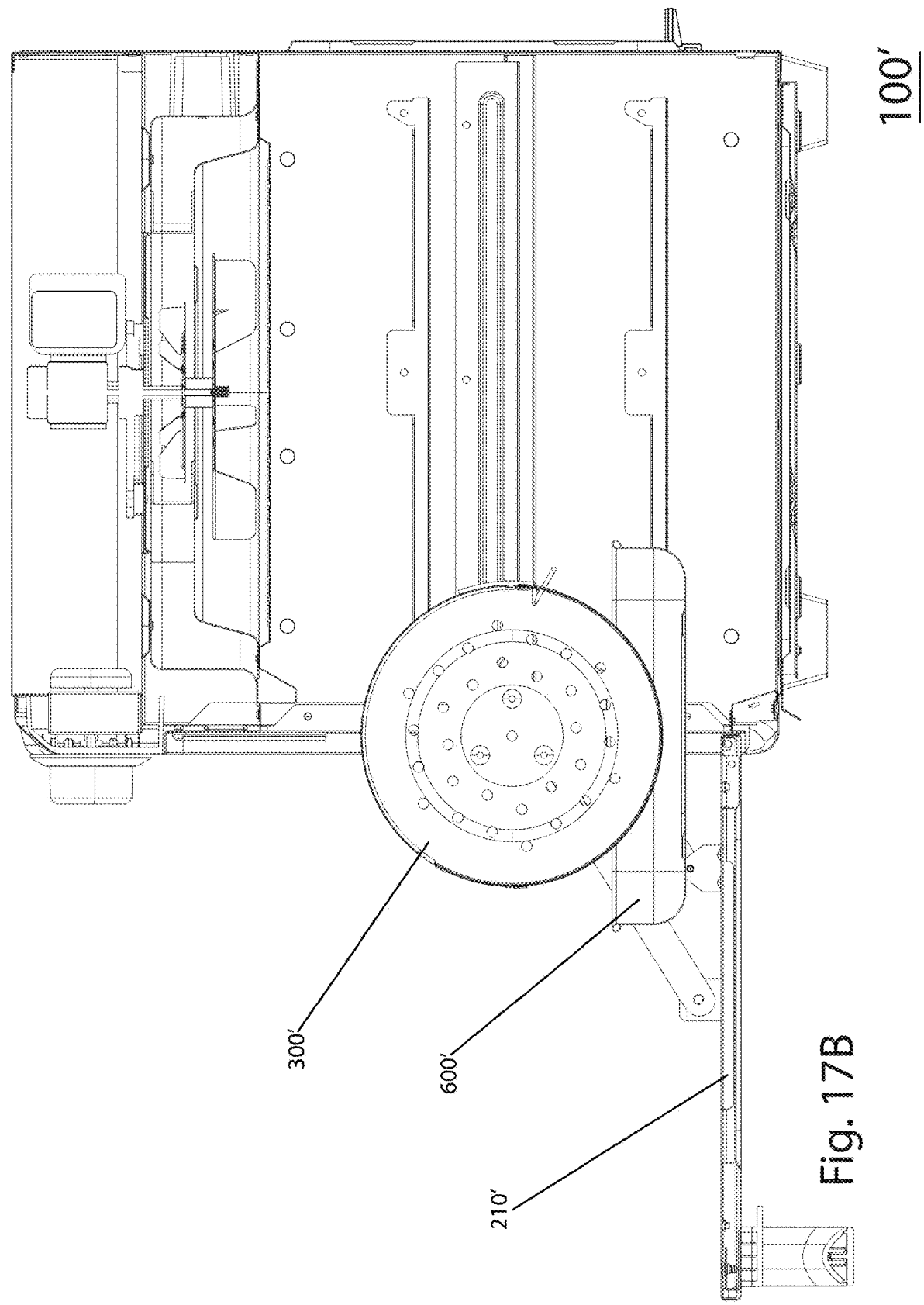

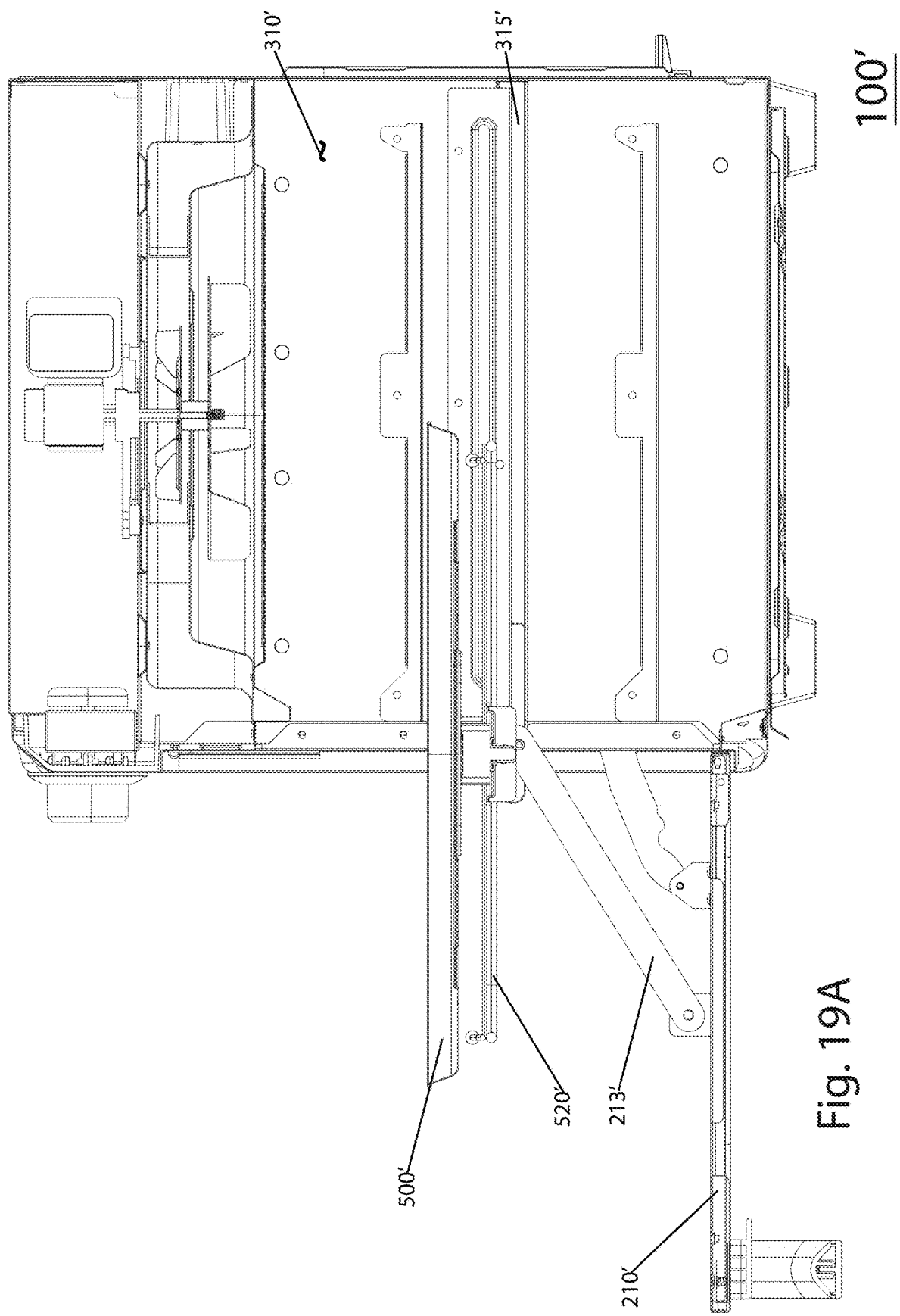

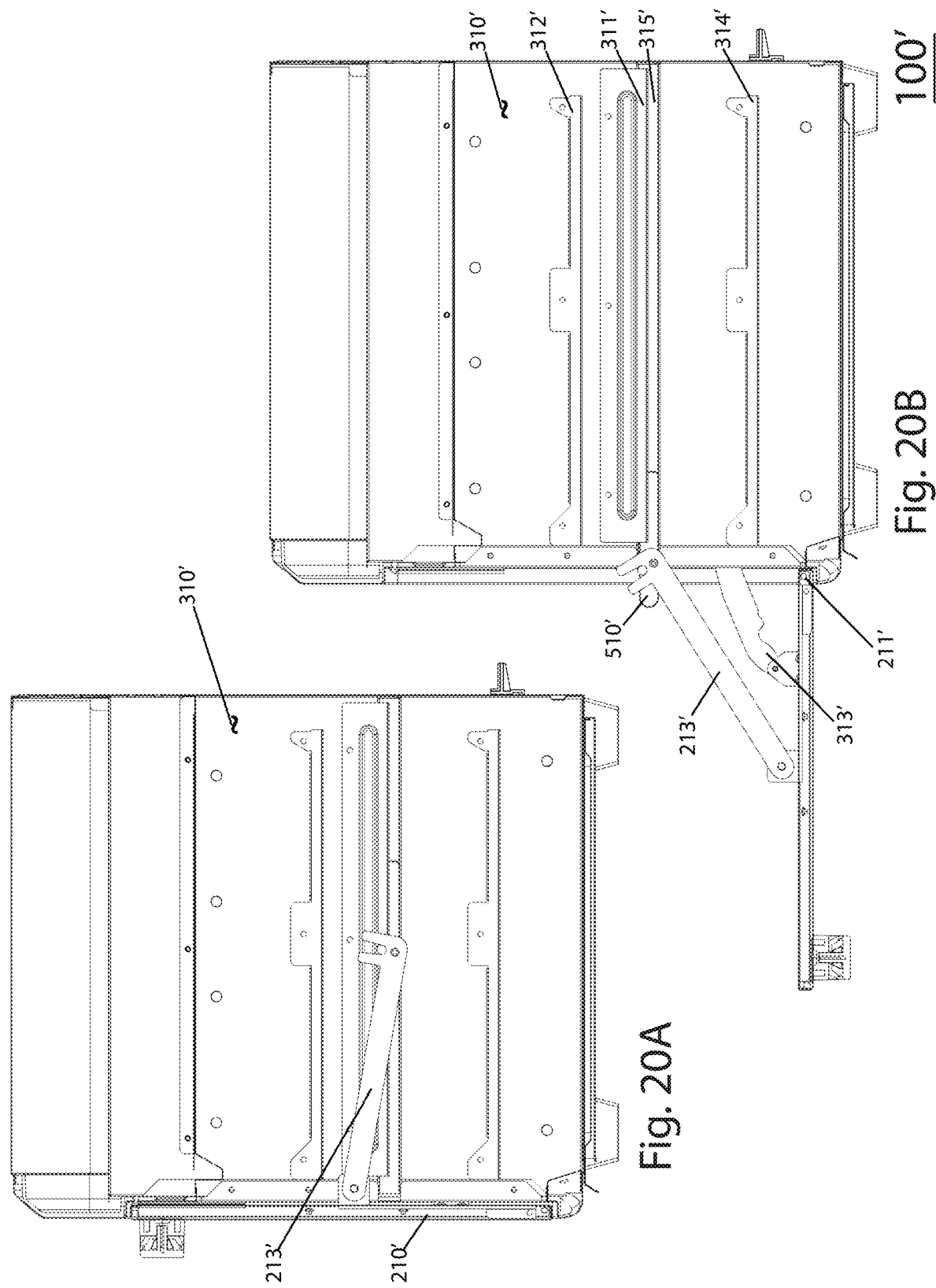

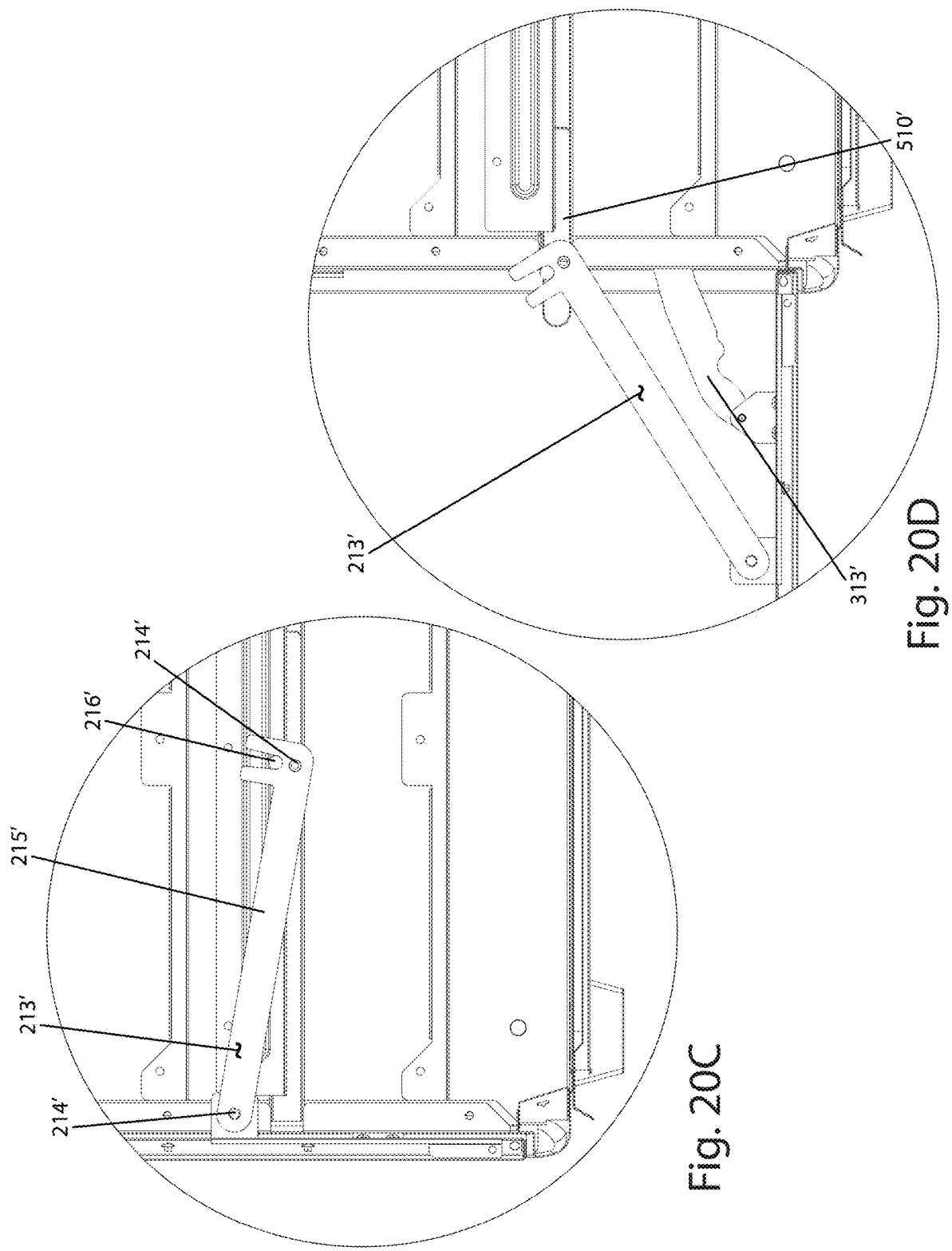

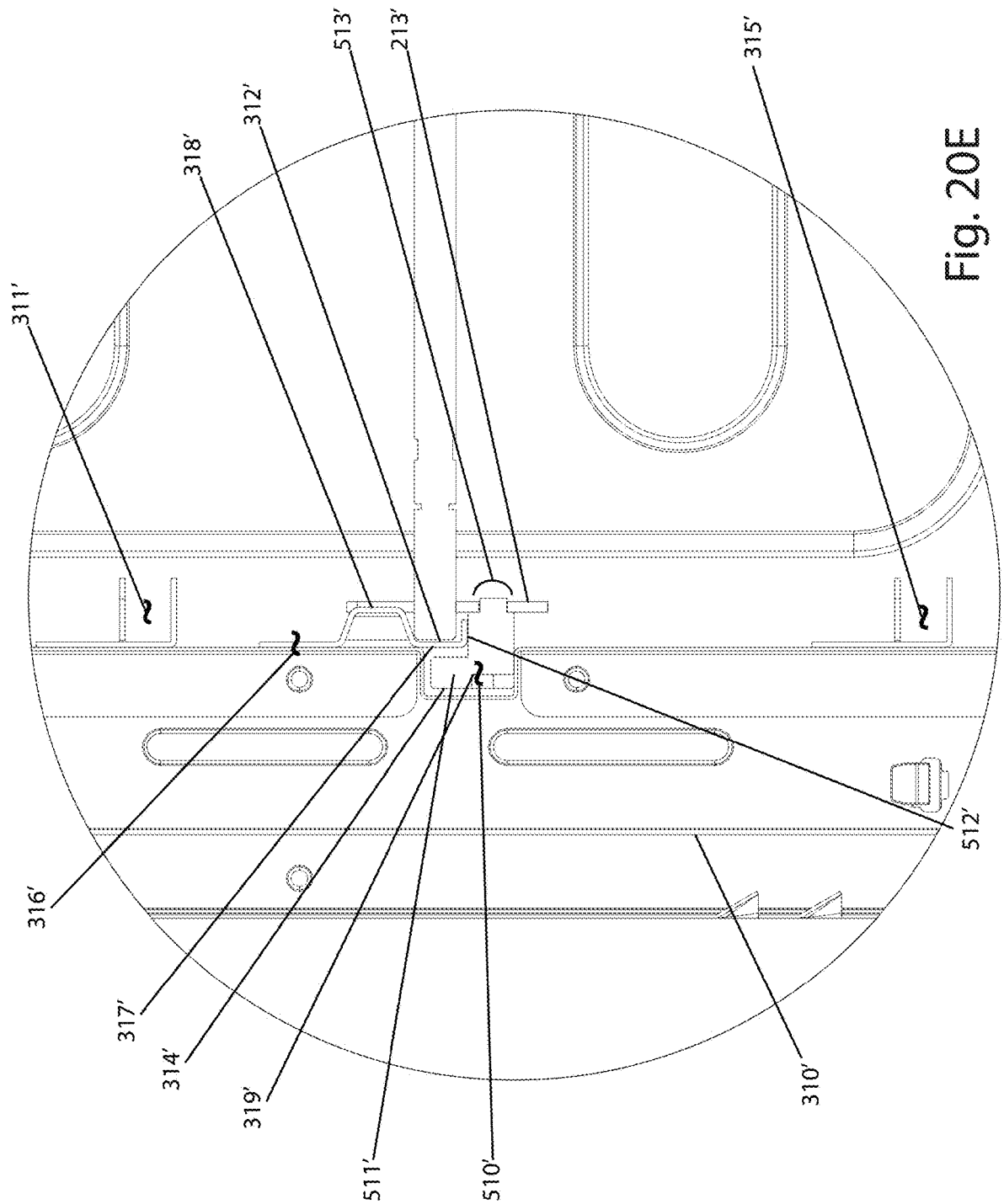

COUNTER TOP COOKING APPLIANCE

RELATED APPLICATION

This application is a Continuation-in-Part of U.S. Ser. No. 15/078,933 filed on 23 Mar. 2016, which was a non-Provisional Continuation of U.S. Provisional Application No. 62/136,853 filed on 23 Mar. 2015, the teachings of which are incorporated herein in their entireties by reference.

FIELD OF THE INVENTION

This invention generally relates to an electric appliance for cooking and baking food stuff. More specifically this invention relates to a method and apparatus for cooking and baking a variety of food items and following a variety of recipes, by using a combination of radiant heat transfer to the food and convective heat transfer to the food in a sequence and manner that is best suitable for achieving optimal cooking results for each type of food and recipe.

BACKGROUND

Over the past few decades healthy cooking has become more popular as a result of the medical profession having identified the ties between serious ailments such as heart failure, diabetes and even cancer to the food being consumed and to the method of preparing such food. More specifically it was determined that excessive consumption of unsaturated oils and animal fat should be avoided.

To satisfy the need for healthier cooking consumers have been offered recently a variety of electric cooking appliances that satisfy that need, such as: Rotisseries for roasting chicken for example while allowing the fat to drip away from the meet; Air fryers where "French Fries" can be cooked in hot air to achieve similar results to deep frying the fries; Slow Cooker for preparing stews and other dishes without the use of oil and where lean cuts of meat can be cooked to a tender consistency. Each of these products is designed to perform a specific mode of cooking as will be specifically described in the following paragraphs.

Rotisseries, namely appliances where meat, typically chicken, turkey or other fowl are being cooked by rotating the food to be cooked in front of or underneath a radiant source of heat is not new. In fact, this type of cooking goes back millennia. More recently a typical rotisserie is disclosed in U.S. Pat. No. 7,325,484 to Backus et al titled: Enclosed Rotisserie with added Convenience. The rotisserie in the '484 patent includes a cooking compartment, drive means for turning the food, hinged door and radiant heaters. While serving well as a product for roasting chicken and other fowl to perfection the product would not be useful otherwise and would have to be put away once the chicken is cooked, as it takes a lot of space on the countertop.

Recently, people are looking to replace deep fried food especially deep-fried slice potato-wedges (French Fries) with a cooking method where hot air is used to "air fry" such French Fries. US Publication 2008/0163764 discloses such an appliance. While serving well for air frying and other similar dishes the product would not be useful otherwise and would have to be put away once the French Fries are cooked, as it takes a lot of space on the countertop.

There are many other appliances available on the market that are effective in cooking one specific type of food or another, but at the end of the cooking session that product would have to be put away as it takes a lot of space on the countertop. Along with other benefits and features, the appliance according to the present invention is suited to cook and bake a variety of dishes, such as: roasting chicken, grilling a steak, baking cakes, baking pizza, steaming rice, slow cooking a meal, dehydrating fruit and vegetable, and popping corn kernels to prepare Pop-Corn.

SUMMARY OF THE INVENTION

While not limited thereto, the invention may be embodied in a method and/or apparatus for cooking, in a variety of modes, a variety of foods placed in the cooking compartment of a countertop cooking appliance.

The invention may be embodied in or practiced using a countertop cooking appliance having a cooking compartment with at least one source of heat, and a driver for continually rotating at least a portion of a food holder within the cooking compartment about a horizontal axis to uniformly expose food therein to the at least one source of heat. The appliance may have a door integral to the cooking compartment, having closed and open positions and having a food holder support adapted to receive the food holder in a first location outside the cooking compartment when the door is in the open position, shuttle the food holder from the first location to the horizontal axis where the food holder engages the driver when the door is moved to the closed position, and shuttle the food holder back to the first location outside the cooking compartment when the door is moved back to the open position, where the food holder can be removed from the food holder support.

The food holder may be a cylindrical food basket having two horizontal axles extending coaxially, and oppositely outwardly there-from. Each of the two horizontal axles may be releasably supportable by the food holder support, so that the two horizontal axles are coaxial with the horizontal axis when the cylindrical food basket is there-at, and rotation of the food holder within the cooking compartment may be rotation of the cylindrical food basket about the two horizontal axles for uniform exposure of the food therein to the at least one source of heat.

The countertop cooking appliance may further have a drip tray engaging and positioned underneath the cylindrical basket for collecting drippings from the food. The drip tray may be pivotably and removably suspended from the two horizontal axles such that the drip tray remains positioned underneath the cylindrical basket, whether it is in the first location, rotating at the horizontal axis, or anywhere in between. The drip tray may be adapted while engaging the two horizontal axles to support the cylindrical basket when lifted thereby or when rested thereon upon a horizontal surface.

The invention may alternatively be embodied in or practiced using a countertop cooking appliance having a cooking compartment with at least one source of heat, a driver for continually rotating at least a portion of a food holder within the cooking compartment about a vertical axis to uniformly expose food thereon to the at least one source of heat, and a guide. The appliance further having the food holder and a door integral to the cooking compartment, having closed and open positions, and having a food holder support adapted to receive the food holder in a first location outside the cooking compartment when the door is in the open position, shuttle the food holder from the first location to the vertical axis where the food holder engages the driver when the door is moved to the closed position, and shuttle the food holder back to the first location outside the cooking compartment when the door is moved back to the open position where the food holder can be removed from the food holder support. The food holder may be further adapted to engage the guide such that the at least a portion of a food holder maintains a horizontal disposition in the first location, at the vertical axis, and during shuttling there-between. The guide may be a pair of guide channels, each disposed on an opposite sidewall of the cooking compartment, and the food holder may include a planar food tray and a first pair of horizontal pins extending coaxially and oppositely outwardly there-from. Each of the first pair of horizontal pins may be releasably supportable by the food holder support.

The food holder may also include a second pair of horizontal pins extending oppositely outwardly there-from. Each of the second pair of horizontal pins may releasably engage one of the guide channels when the food holder is at the first location, at the vertical axis, or anywhere there-between. The rotation of the at least a portion of the food holder within the cooking compartment may be rotation of the planar food tray about the vertical axis for uniform exposure of the food thereon to the at least one source of heat.

The invention may alternatively be embodied in or practiced using, in combination, a food tray, a cylindrical food basket, and a countertop cooking appliance. The countertop cooking appliance may have a cooking compartment having at least one source of heat, a driver for alternatively rotating either at least a portion of the food tray within the cooking compartment about a vertical axis or the cylindrical food basket within the cooking compartment about a horizontal axis, for uniformly exposing food therein to the at least one source of heat, and a guide. The appliance may further have a door integral to the cooking compartment, having closed and open positions and having a food holder support adapted to receive the cylindrical food basket in a first basket location outside the cooking compartment when the door is in the open position, shuttle the cylindrical food basket from the first basket location to the horizontal axis where the cylindrical food basket engages the driver when the door is moved to the closed position, and shuttle the cylindrical food basket back to the first basket location outside the cooking compartment when the door is moved back to the open position, where the cylindrical food basket can be removed from the food holder support. The food holder support may be adapted to receive the food tray in a first tray location outside the cooking compartment when the door is in the open position; shuttle the food tray from the first tray location to the vertical axis when the door is moved to the closed position and shuttle the food tray back to the first tray location for removal there-of when the door is moved back to the open position.

The food tray may be further adapted to engage the guide such that the at least a portion of the food tray maintains a horizontal disposition in the first tray location, at the vertical axis, and during shuttling there-between. The guide may be a pair of guide channels, each disposed on an opposite sidewall of the cooking compartment, and wherein the food tray may be a planar food tray having a first pair of horizontal tray pins extending coaxially and oppositely outwardly there-from. Each of the first pair of horizontal tray pins may be releasably supportable by the food holder support. The food tray may also have a second pair of horizontal tray pins extending oppositely outwardly there-from, each of the second pair of horizontal tray pins releasably engaging one of the guide channels when the food tray is at the first tray location, at the vertical axis, or anywhere there-between. The cylindrical food basket may include two horizontal basket axles extending coaxially and oppositely outwardly there-from. Each of the two horizontal basket axles may be releasably supportable by the food holder support, so that the two horizontal basket axles are coaxial with the horizontal axis when the cylindrical food basket is there-at, and rotation of the cylindrical food basket may be rotation about the two horizontal basket axles for uniform exposure of the food therein to the at least one source of heat.

This appliance may also include a drip tray engaging and positioned underneath the cylindrical food basket for collecting drippings from the food. The drip tray may be pivotably and removably suspended from the two horizontal basket axles such that the drip tray remains positioned underneath the cylindrical food basket, whether it is in the first basket location, rotating at the horizontal axis, or anywhere in between. The drip tray may be adapted while engaging the two horizontal basket axles to support the cylindrical food basket when lifted thereby or when rested thereon upon a horizontal surface.

The invention may alternatively be embodied in or practiced using countertop cooking appliance having a cooking compartment with an inner chamber adapted to receive, one at a time, a first food holder and a second food holder, and having at least one source to generate heat within the inner chamber. A driver may be adapted for causing rotation within the inner chamber about a horizontal axis. The first food holder may have a first horizontal axle fixed thereto and projecting outwardly therefrom and connectable to the driver and rotatable thereby about the horizontal axis to rotate the first horizontal axle and the first food holder within the inner chamber and uniformly expose food held by the first food holder to the at least one source. The second food holder may have a second horizontal axle rotational relative thereto and projecting outwardly from opposite sides thereof and connectable to the driver and rotatable thereby about the horizontal axis, and having a vertical axle fixed thereto and rotationally connected to the second horizontal axle and rotatable thereby about a vertical axis to rotate the vertical axle and the second food holder and uniformly expose food held by the second food holder to the at least one source.

The appliance may have a door having an open position for exposing the inner chamber and a closed position for enclosing the inner chamber and a food holder support including a pair of arms linked to the door and movable therewith. Each arm may include a yoke adapted to receive, one at a time, a selected one of the first and second horizontal axles in a first location outside the inner chamber when the door is in the open position, shuttle the selected one from the first location into the inner chamber and into connection with the driver when the door is moved to the closed position, and shuttle the selected one back to the first location outside the inner chamber when the door is moved back to the open position, where the selected one can be removed from the food holder support.

The first and second horizontal axles may each extend from opposite sides of the associated food holder to be received within the yokes. The inner chamber may include horizontal guides, and the second food holder may further include a horizontal rod parallel to the second horizontal axle and extending from opposite sides of the second food holder support into and engageable within the guides when the second food holder is within the inner chamber to prevent horizontal rotation of the second food holder.

The first food holder may include a cylindrical food basket, and rotation of the first food holder within the cooking compartment may consist of rotation of the cylindrical food basket about the horizontal axis for uniform exposure of the food therein to the at least one source of heat.

The first food holder may include a drip tray engaging the cylindrical food basket and pivotable relative thereto about the horizontal axis such that the drip tray is always positioned underneath the cylindrical food basket for collecting drippings from the food. The drip tray may be adapted to support the cylindrical food basket when removed from the appliance and set upon a horizontal surface.

The second food holder may be a planar food tray and rotation of the second food holder within the inner chamber may consist of rotation of the planar food tray about the vertical axis for uniform exposure of the food held thereby to the at least one source of heat. the horizontal guides engage the horizontal rod as the second food holder enters the inner chamber to maintain the planar food tray in a horizontal disposition.

The horizontal guides may be a pair of guide channels, each disposed on an opposite sidewall of the inner chamber. the first food holder comprises a cylindrical food basket and rotation of the first food holder within the cooking compartment comprises rotation of the cylindrical food basket about the horizontal axis for uniform exposure of the food therein to the at least one source of heat.

It is an object of this invention to provide a countertop cooking appliance that can optimally perform a variety of cooking modes. It is a further object of this invention to provide a countertop cooking appliance that includes a source of radiant heat as needed in certain cooking modes. It is a further object of this invention to provide a countertop cooking appliance that includes source of convective heat as needed in certain cooking modes. It is a further object of this invention to provide a countertop cooking appliance that includes programmable controller capable of controlling both heating sources in a manner that would be best suitable for certain cooking modes.

It is a further object of this invention to provide a countertop cooking appliance that includes a hinged door for access to the cooking compartment of the appliance. It is a further object of this invention to provide a drive means integral of the cooking appliance for rotating the food stuff to expose the food stuff uniformly to the sources of heat. It is a further object of this invention to provide a cylindrical basket including two axles extending outwardly from the cylindrical basket. Each of the two axles are releaseably supported by two arms integral to the hinged door, so that when the hinged door is closed the cylindrical basket engages the drive means causing the container to rotate about its horizontal axis for exposing different parts of the food stuff to the radiant source of heat. When the hinged door is opened the cylindrical basket is disengaged from the drive means and is removed from the interior of the cooking appliance for ease or removal by the operator.

It is a further object of this invention to provide a drip tray for collecting fat and other drippings from food being cooked inside the rotating cylindrical basket. The drip tray is removable from the two axles of the cylindrical basket and freely swings from the axles; it will therefore remain positioned underneath the rotating cylindrical basket wherever it is.

It is a further object of this invention to provide a horizontal platform to support food stuff being cooked. The horizontal platform is supported on a frame so it is free to spin about its vertical axis. The frame includes two sets of outwardly extending pins. One set of pins is designed to slide in a set of tracks integral to the left and right wall of the cooking compartment. Second set of pins are releaseably supported by two arms integral to the hinged door, so that when the hinged door is closed the horizontal platform engages the drive means causing the platform to rotate about its vertical axis for exposing different parts of the food stuff to the sources of heat. When the hinged door is opened the horizontal platform is disengaged from the drive means and is removed from the interior of the cooking appliance for ease of removal by the operator.

Further features and objects will become apparent upon viewing the following Description and Drawings of exemplary embodiments.

BRIEF DESCRIPTION OF THE DRAWINGS

The various objects, advantages and novel features of this invention will be more fully apparent from a reading of the following detailed description of an exemplary embodiment thereof, in conjunction with the accompanying drawings in which like reference numerals refer to like parts, and in which:

FIGS. 6A, 6B, and 6C are different views of the horizontal platform for supporting food stuff;

FIGS. 9A, 9B, 9C, and 9D are cross sectional views of the is a cross sectional view of the countertop cooking appliances showing the hinged door and the platform for supporting food stuff in four different positions;

FIGS. 16A, 16B, 16C and 16D are different views of the horizontal rotatable platform for supporting food stuff, and the wire rack on which supports it;

FIG. 17B is a cross sectional view of the countertop cooking appliances taken along the lines 7-7 of FIG. 3

FIG. 19A is a cross sectional view of the countertop cooking appliances taken along the lines 9-9 of FIG. 12;

FIG. 20A is a cross sectional view of the countertop cooking appliances as shown in FIG. 19A, with rotatable platform for supporting food stuff removed;

FIG. 20B is a cross sectional view of the countertop cooking appliances as shown in FIG. 19B, with rotatable platform for supporting food stuff removed;

FIG. 20C is an enlarged partial cross-sectional view of the countertop cooking appliances as shown in FIG. 20A;

FIG. 20D is an enlarged partial cross-sectional view of the countertop cooking appliances as shown in FIG. 20B; and FIG. 20E is a cross sectional view along line 20-20 in FIG. 20C

DESCRIPTION OF AN EXEMPLARY EMBODIMENT

Figure 1:
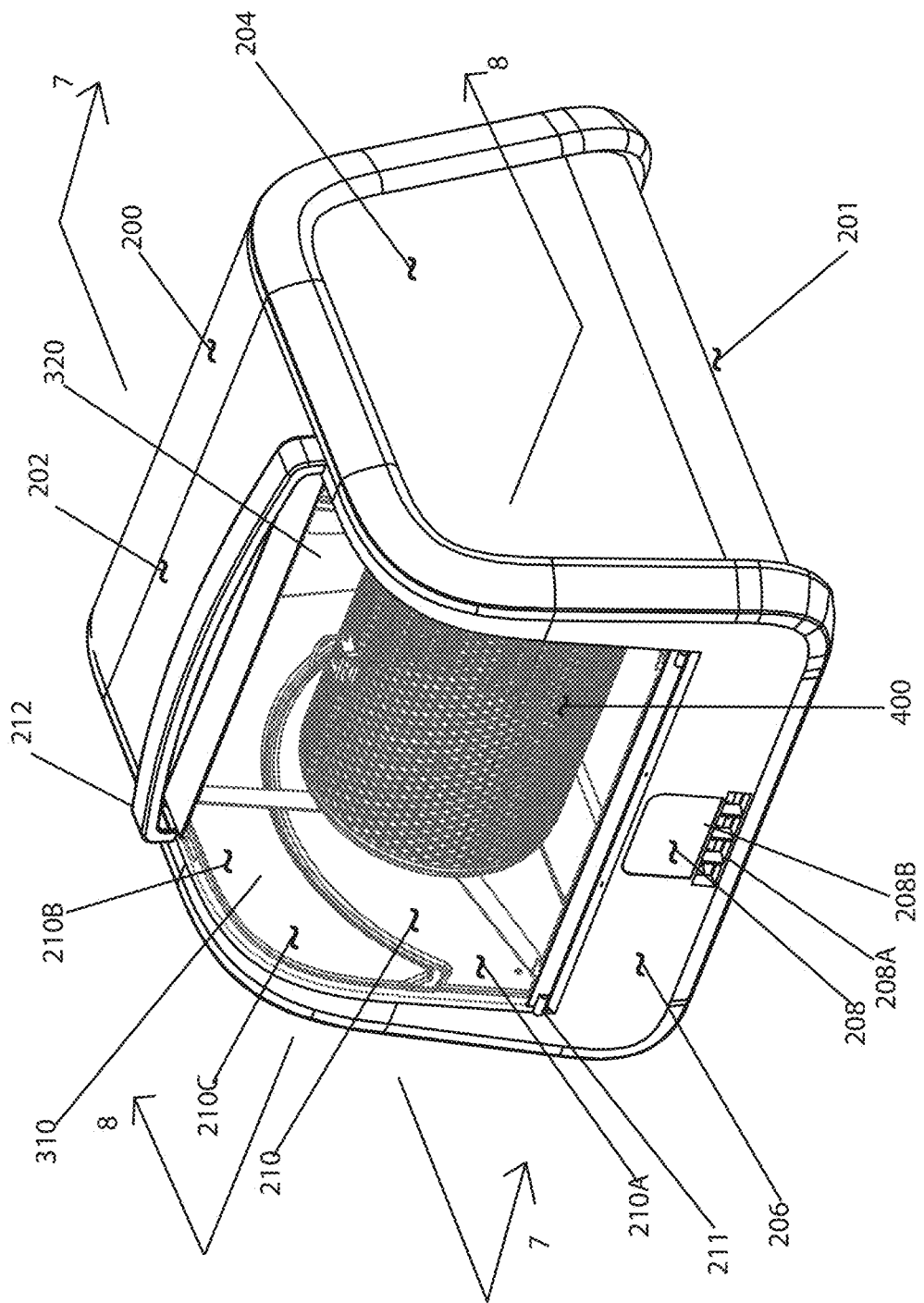
FIG. 1 is an isometric view of a countertop cooking appliance according to a first embodiment, with a cylindrical basket shown through the glass front door.
Figure 2:
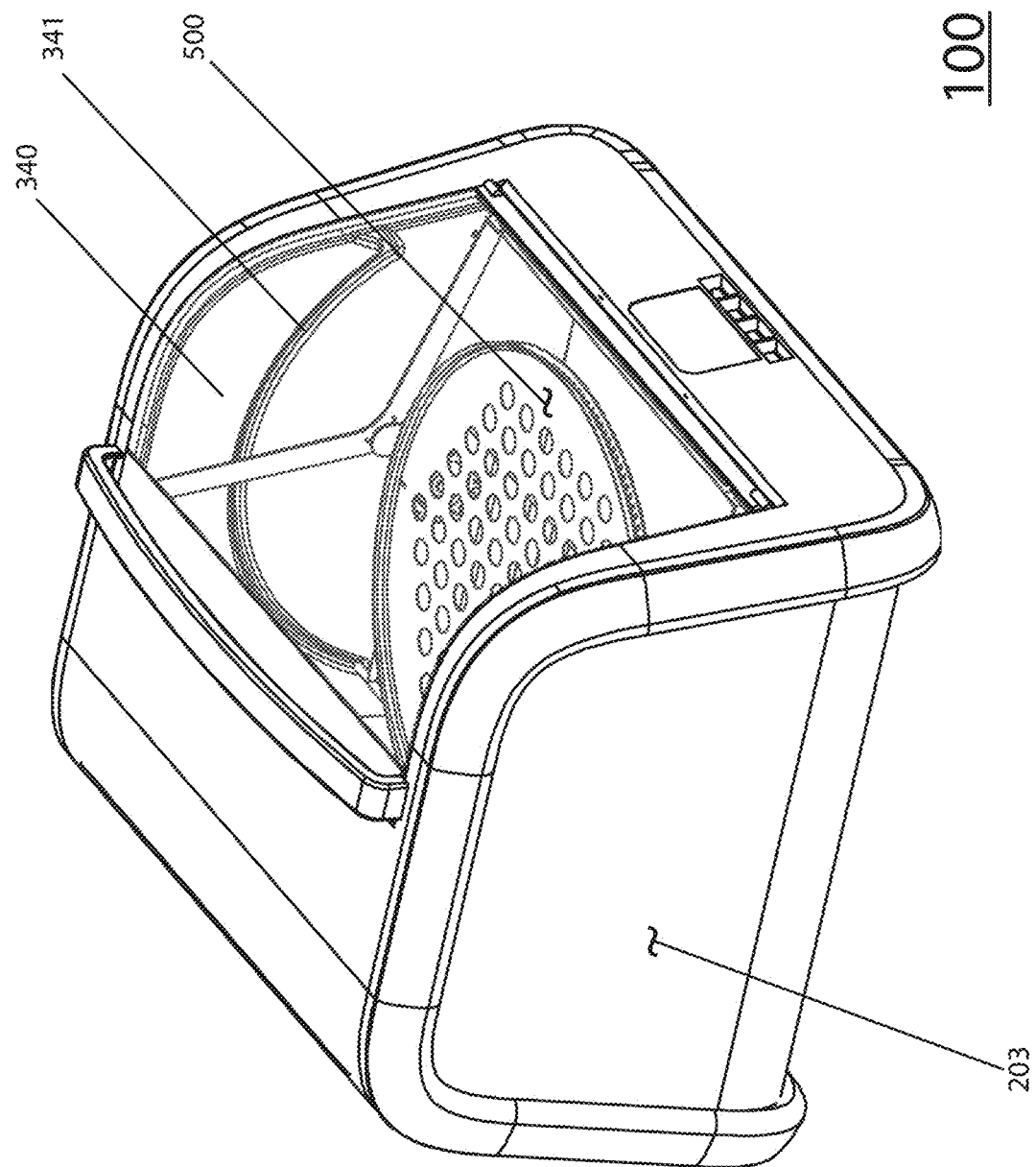
FIG. 2 is another isometric view of a countertop cooking appliance according to the invention, with a horizontal platform for supporting food stuff shown through the glass front door.

A first exemplary countertop cooking appliance 100 in accordance with and/or for use in practicing to the invention is shown as isometric views in FIG. 1 and FIG. 2. In particular, an outer enclosure 200 consists of a bottom 201 a top 202 a left side 203 a right side 204, a rear 205 (not shown) and a front 206. Also shown a hinged door 210, preferably partially or fully transparent, with a hinge 211 at its lower end and a handle 212 at its upper end. The hinged door 210 which may be made of glass or high temperature plastics consists of two plane portions 210A and 210B and a curved portion 210C connecting the two. Also shown is a user interface 208 consisting of a series of buttons 208A and a display 208B.

Also visible through transparent door 210 in FIG. 1 and FIG. 2 are side walls 310, 340 and 320 ofthe cooking compartment 300 as well as cylindrical basket 400 and horizontal platform for supporting food stuff 500.

Figure 3:
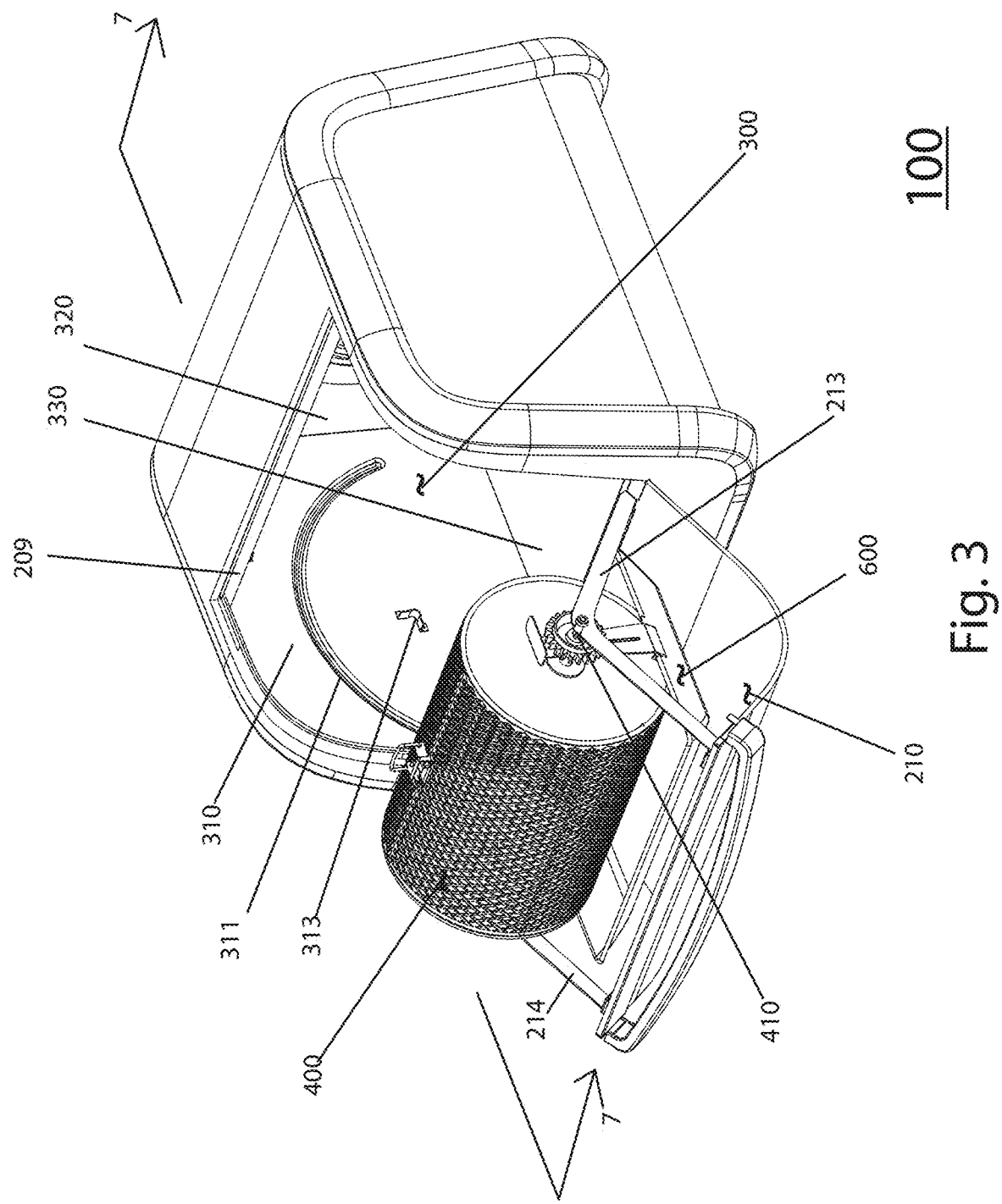
FIG. 3 is an isometric view of a countertop cooking appliance according to the invention, with the front door hinged open and a cylindrical basket shown outside the cooking compartment.

FIG. 3 is an isometric view of the countertop cooking appliance 100 with its door 210 hinged in an open position and a perforated cooking container 400 removably supported by its axels 410 and 411 (not visible) on brackets 213 and 214. Also shown is drip tray 600 suspended from axels 410 and 411. Left side wall 310 shown incorporates and arcuate track 311 and a bracket 313 for supporting axel 410 when door 210 is in its closed position. Also shown is back wall 320 and bottom 330 of cooking compartment 300, as well as horizontal bar 209 serving to support the door 210 when it is hinged to a closed position.

Figure 4:
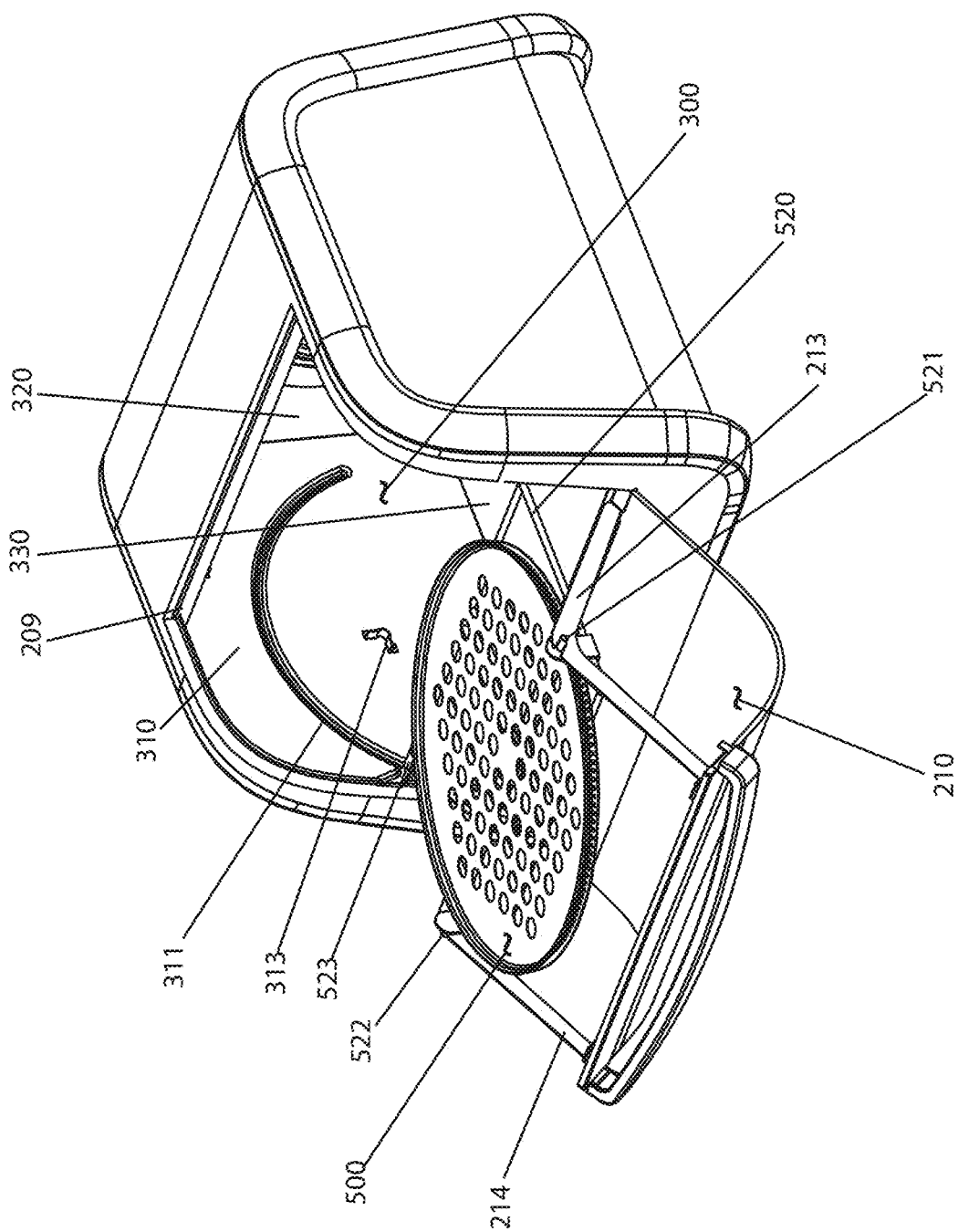
FIG. 4 is an isometric view of a countertop cooking appliance according to the invention, with the front door hinged open and platform for supporting food stuff shown outside the cooking compartment.

FIG. 4 is an isometric view of the countertop cooking appliance 100 with its door 210 hinged in an open position and a horizontal cooking platform 500 for supporting food stuff positioned on a frame 520, which in turn is removably supported by pins 521 and 522 on brackets 213 and 214; also supported by its pins 523 and 524 (not visible) that may slide along tracks 311 in left side wall 310 and 341 (not visible) in right side wall 340 (not visible); also shown is bracket 313 and 314 (not visible) for supporting axels 521 and 522 when door 210 is in its closed position so that the axle is restrained by brackets 313 and 314 and does not apply too great a force on the drive means. Also shown back wall 320 and bottom 330 of cooking compartment 300, as well as horizontal bar 209 serving to support the door 210 when it is hinged to a closed position.

Figure 5B:
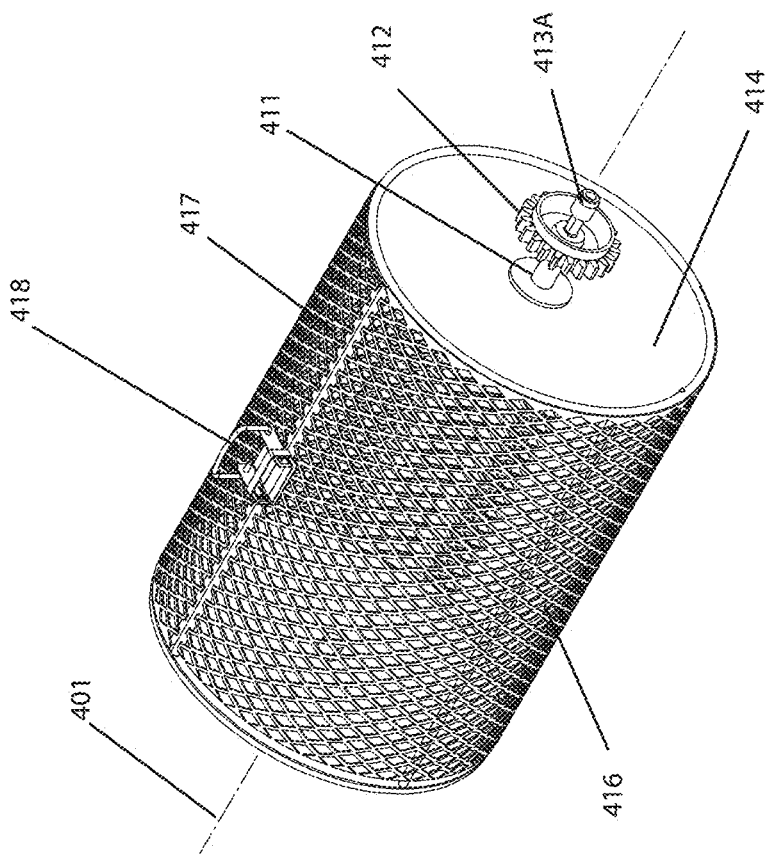
FIGS. 5A and 5B are isometric views of the cylindrical basket.
Figure 5A:
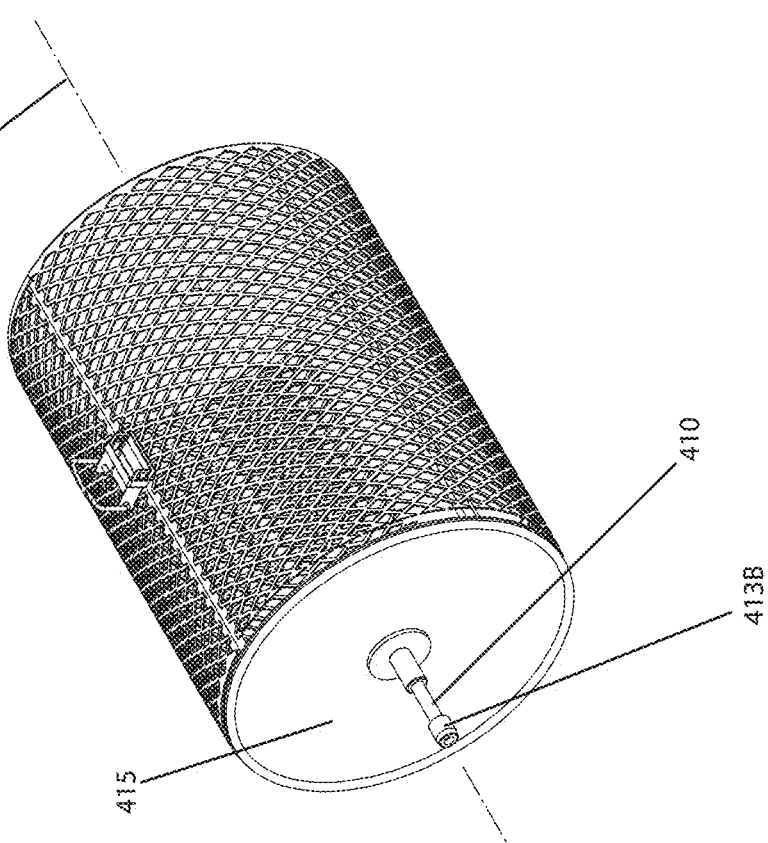

Reference is next made to FIGS. 5 and 5A, which are two isometric views of the rotatable cylindrical basket 400 made to be rotated about its horizontal axis 401 and made for containing food such as a whole chicken or chicken parts to be rotisserie cooked by being exposed to radiant heat, potato wedges to be "air fried" by being exposed to a stream of hot air and radiant heat, sliced vegetables to be "stir frying" in hot air, a steak to be broiled by exposure to radiant heat, corn kernels to be "popped" by contact with hot air, as well as other food stuff that would benefit from being tumbled as it is exposed to either or both radiant and convective heat.

The cylindrical basket 400 has two side walls 414 and 415 and a meshed cylindrical body 417 spanning from one to the other side walls. The side walls are shown as solid circular plates but could also be shaped as a polygon; they could also be perforated in one manner or another. The cylindrical body is made of expanded metal shaped as two half cylinders 416 and 417, hinged together along an axial line, where one half 417 is permanently connected to both side walls whereas the other half 416 can be hinged open to insert or remove food. The two halves are held tightly together by a latch 418, to prevent the basket form opening as it is being rotated during the cooking operation. Two support axles 410, 411 project outwardly from each of the side walls: One of the two axles 411 is provided with a gear 412 designed to mesh with a drive gear 220 for rotating the cylindrical basket 400 about its horizontal axis 401; both the axles are provided with plugs 413A and 413B to prevent the axle from accidentally slipping off the support brackets 213 and 214.

FIGS. 6A, 6B and 6C are three views of a platform 500 and its support frame 520 used for supporting variety of food stuff to be cooked, while slowly turning about a vertical axis 501. The platform 500 as shown includes a flat section 501 with multiple apertures 502 (it could also be solid or made from expanded metal or a frame and a screen) is designed to support a pizza pie, exposing it to radiant and convective heat; slices of bread to be toasted; a cake pan; fruit or vegetable slices to be dehydrated by lengthy exposure to tempered temperature air flow.

The platform 500 includes the flat surface 501 with multiple apertures 502 surrounded by a raised rim 503; attached to the underside of the flat surface is a slotted ring 504 designed to mesh with a drive gear 220 for causing the platform to slowly turn about its vertical axis 501. On the lower face of the platform, at its center is an inverted circular cup 505 which fits over a cylindrical projection 506 attached to the center of the support frame 520. The cup 505 and the cylindrical projection 506 serve as a bearing so that the platform 500 can turn freely about vertical axis 501 common the two parts. The cup 505 and the cylindrical projection 506 can be separated for removal of the platform 500 from the frame 520 for cleaning or other purposes. The support frame 520 is made from a series of metal rods bent and welded together in a manner known in the art. The support frame 520 has two sets of outwardly projecting pins, one set 523, 524 at the level of the support frame and other set 521, 522 extends from two small plates 517, 518. The first set of outwardly projecting pins 523, 524 is designed to slide along the arcuate track 311 and 341 in the side walls 310 and 340 of the cooking compartment 300, whereas the second set 521, 522 is designed to be supported on the two hinged door brackets 213, 214. Thus, when the door 210 is closed the second set of pins 521, 522 will travel along the door 210 describing an arc centered about the door hinge 211. The arcuate tracks 311 and 341 in the side walls 310 and 340 have the same radius as defined by the travelling pins 523, 524, to ensure that as the platform 500 travels in and out of the cooking compartment 300 it always remains horizontal. FIGS. 9A, 9B, 9C and 9D illustrate four positions of the platform 500 as the door 210 hinges from closed to open.

Figure 7A:
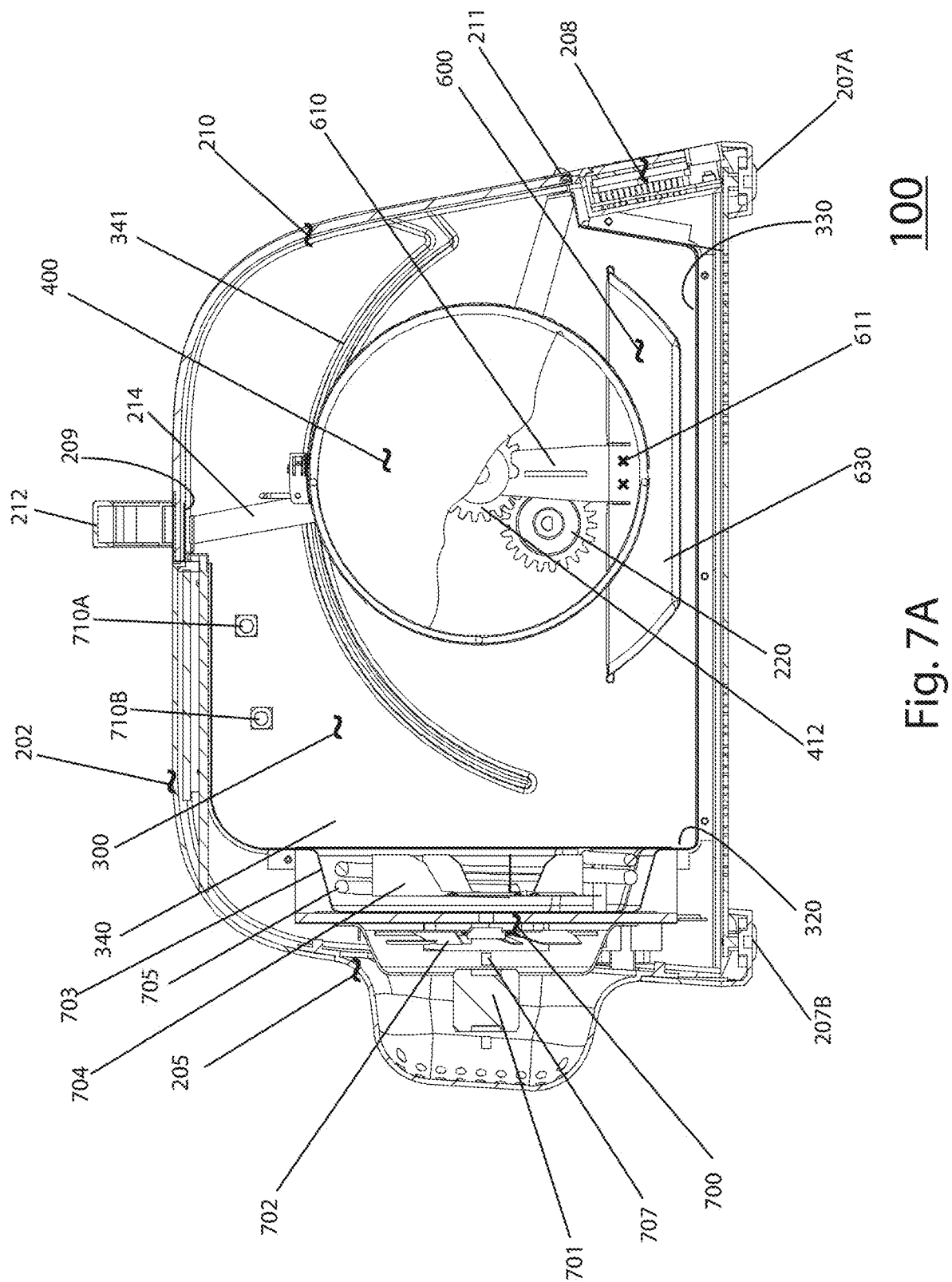
FIG. 7A is a cross sectional view of the countertop cooking appliances taken along the lines 7-7 of FIG. 1.

FIG. 7A is a cross sectional views of the countertop cooking appliance 100 with the hinged door 210 closed and the cylindrical basket 400 in position where its gear 412 engages the drive gear 220 of the appliance. The cylindrical basket 400 is shown with a portion removed to illustrate how the two gears 412, 220 are meshed together. Also shown is the drip tray 600 with one of its support arms 610 suspending the drip tray pan 630 from the axle of the cylindrical basket 411 (not shown). FIG. 7A also shows the arcuate track 341 which is only used in conjunction with the platform 500, as previously described. Also shown two radiant heating rods 710A and 710B as well as the convective heating assembly 700 with a motor 701, a motor cooling fan 702, a cowl 703 communicating with the cooking compartment 300 and containing a convection fan 704 mounted on and driven by the motor shaft 707 of motor 701 and a heating element 705 surrounding the convection fan 704 for heating air exiting from the convection fan 704 blades. Also shown is the hinged door 210 with its support bracket 214, electronic controls 208 on the front lower portion of the appliance. As well as the bottom wall 330 rear wall 320 and top wall 350 of the cooking compartment 300, and the outer wall 240 of the appliance spaced apart from the walls of the cooking compartment 300 to maintain the outer enclosure 200 cool to the touch. Also shown are two of the four support feet 207 to keep the appliance off the kitchen counter.

Figure 7B:
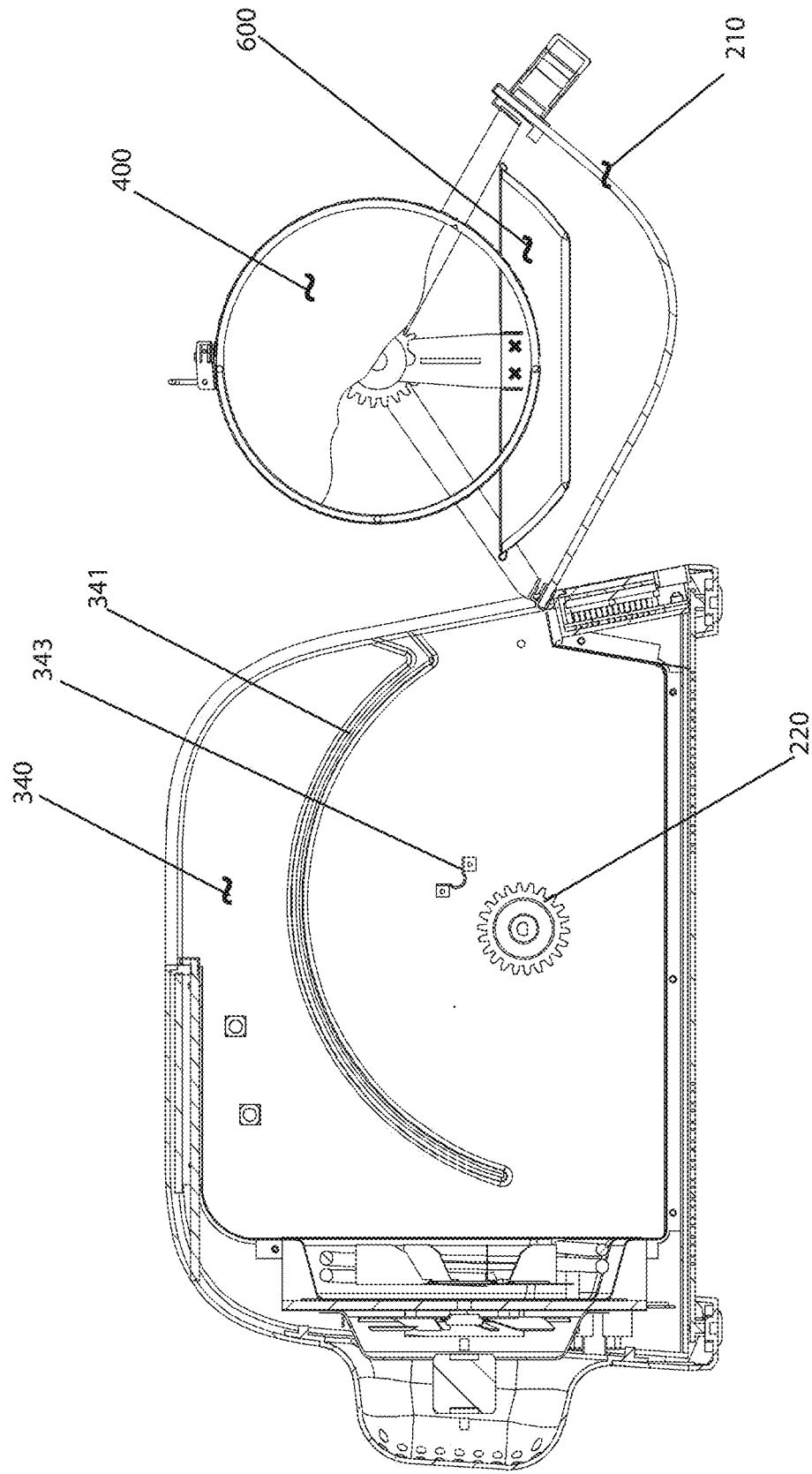
FIG. 7B is a cross sectional view of the countertop cooking appliances taken along the lines 7-7 of FIG. 3

FIG. 7B shows the same cross section as FIG. 7 A, except that the hinged door 210 is shown in its open position with the cylindrical basket 400 completely outside the oven for easy removal by the user. The drip tray 600 is shown positioned underneath the cylindrical basket 400 so that any drippings would be contained and not mar the glass door. Also shown on the side wall 340 a retraining bracket 343 meant to support the axle 410 of the cylindrical basket 400 so as not to apply too much weight to the gear motor 230.

Figure 8:
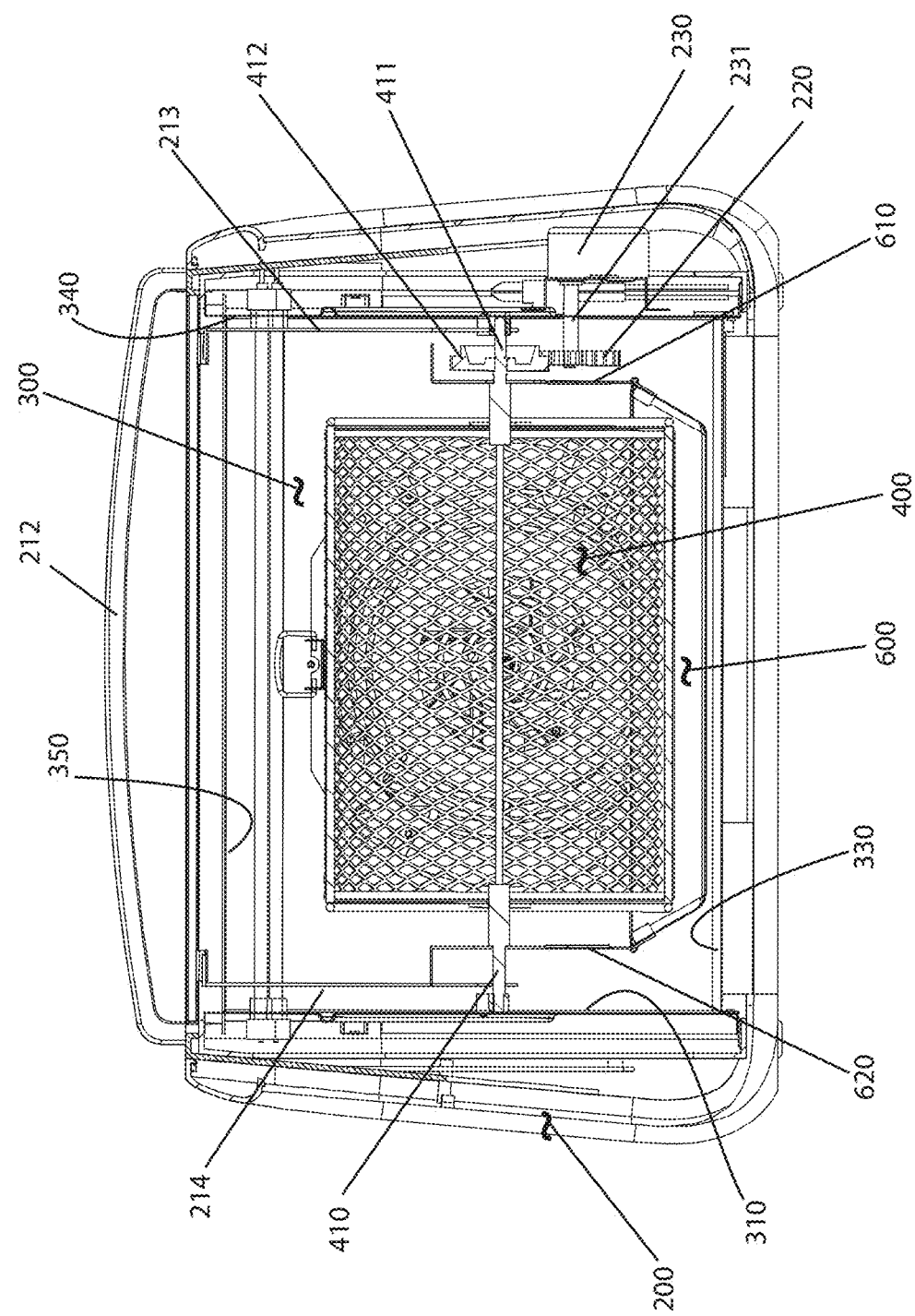
FIG. 8 is a cross sectional view of the countertop cooking appliances taken along the lines 8-8 of FIG. 1.

FIG. 8 is a frontal cross-sectional view of the countertop cooking appliance 100 showing the cylindrical basket axles 410, 411 supported on the door brackets 213, 214, with the drip tray 600 suspended from the axles 410, 411 by its two side brackets 610 and 620. Also shown is the gear motor 230 located in the space between the outer enclosure 200 and the cooking compartment 300 with its shaft 231 penetrating through side wall 340, the shaft 231 terminating in a gear 220 shown in engagement with the axle gear 412 of the cylindrical basket 400. Also shown are the hinged door handle 212, the top 350 and bottom 330 as well as side walls 310, 340 of the cooking compartment 300 and the outer enclosure 200 of the appliance.

Figure 9B:
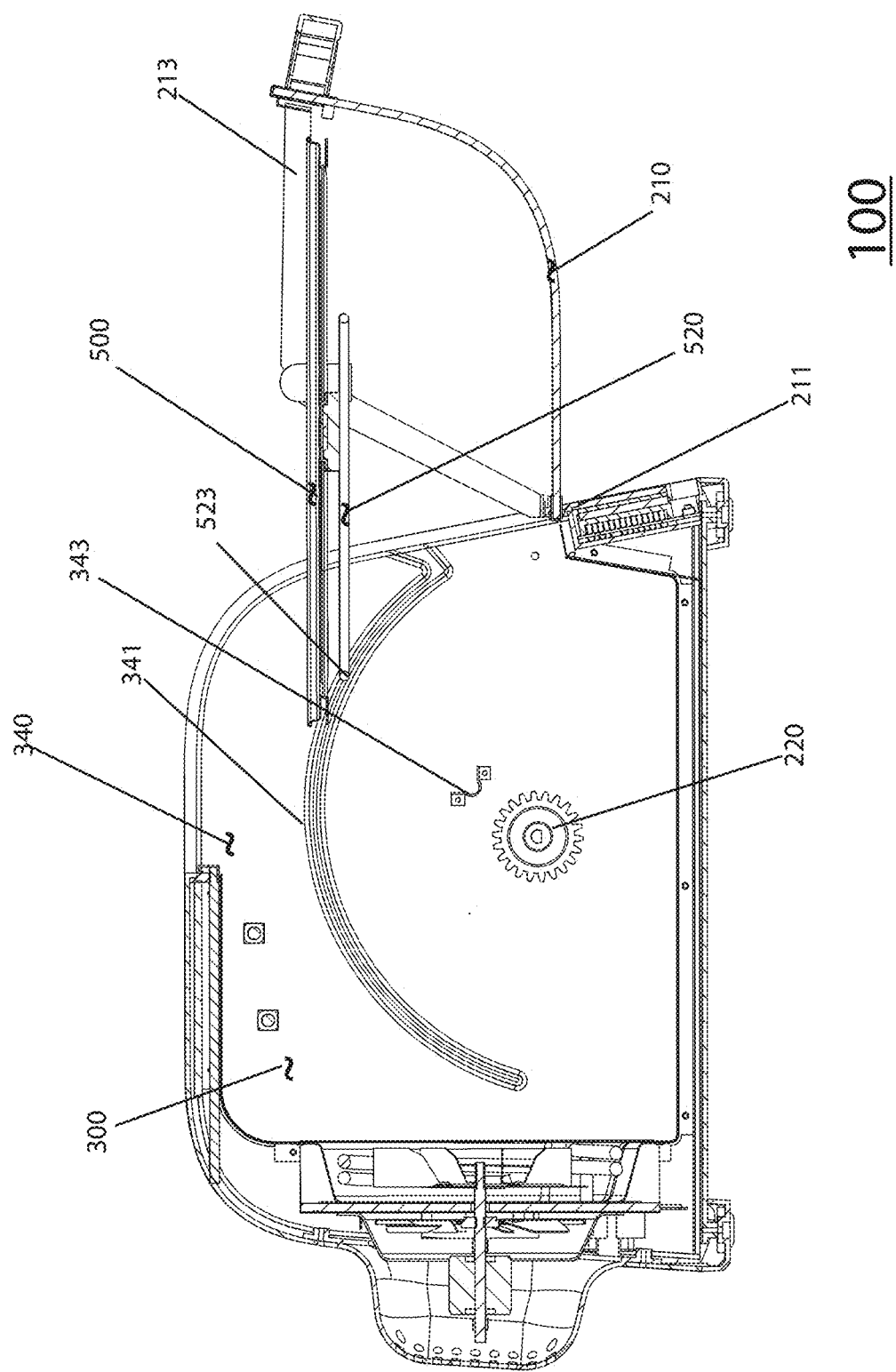
Figure 9C:
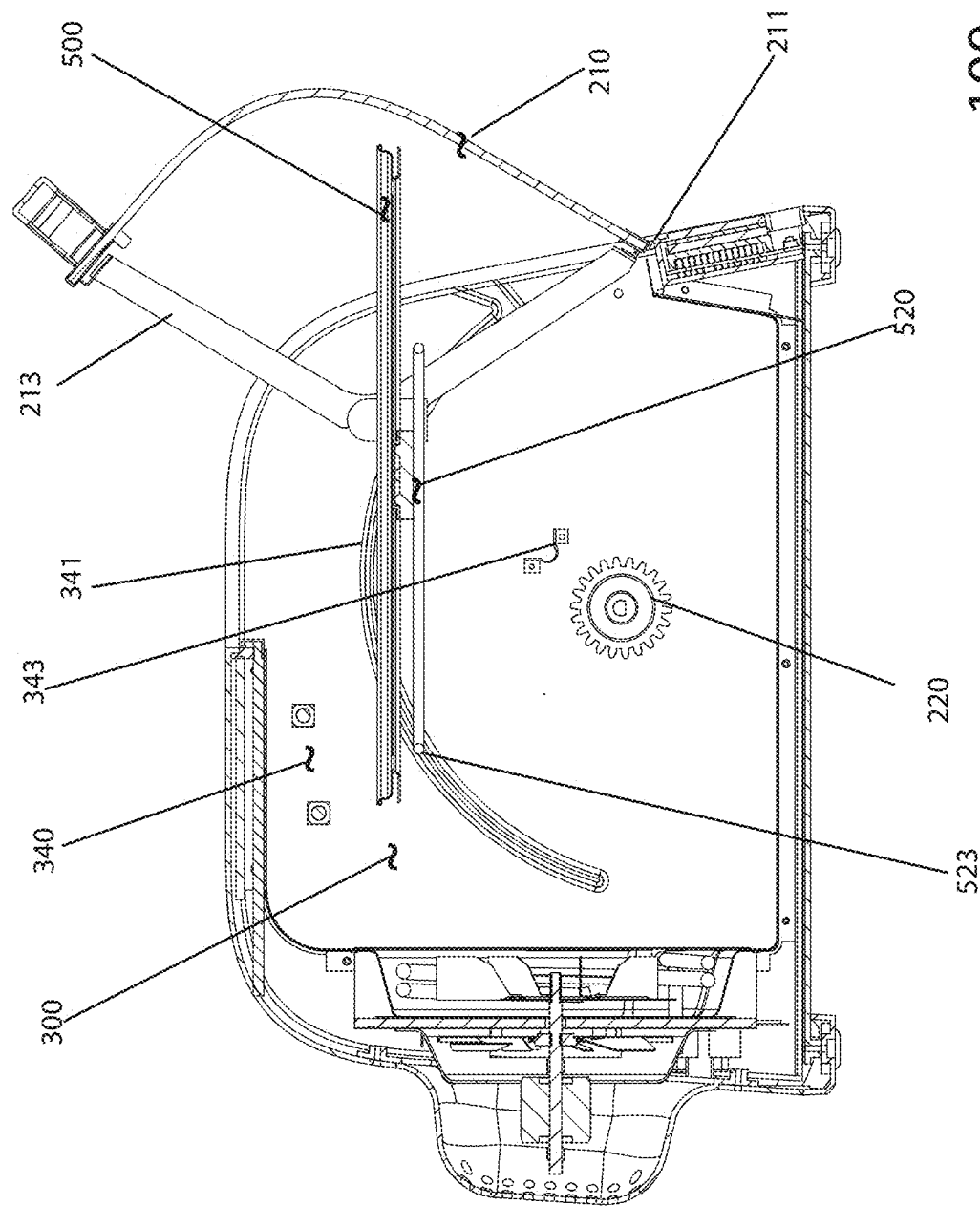
Figure 9D:
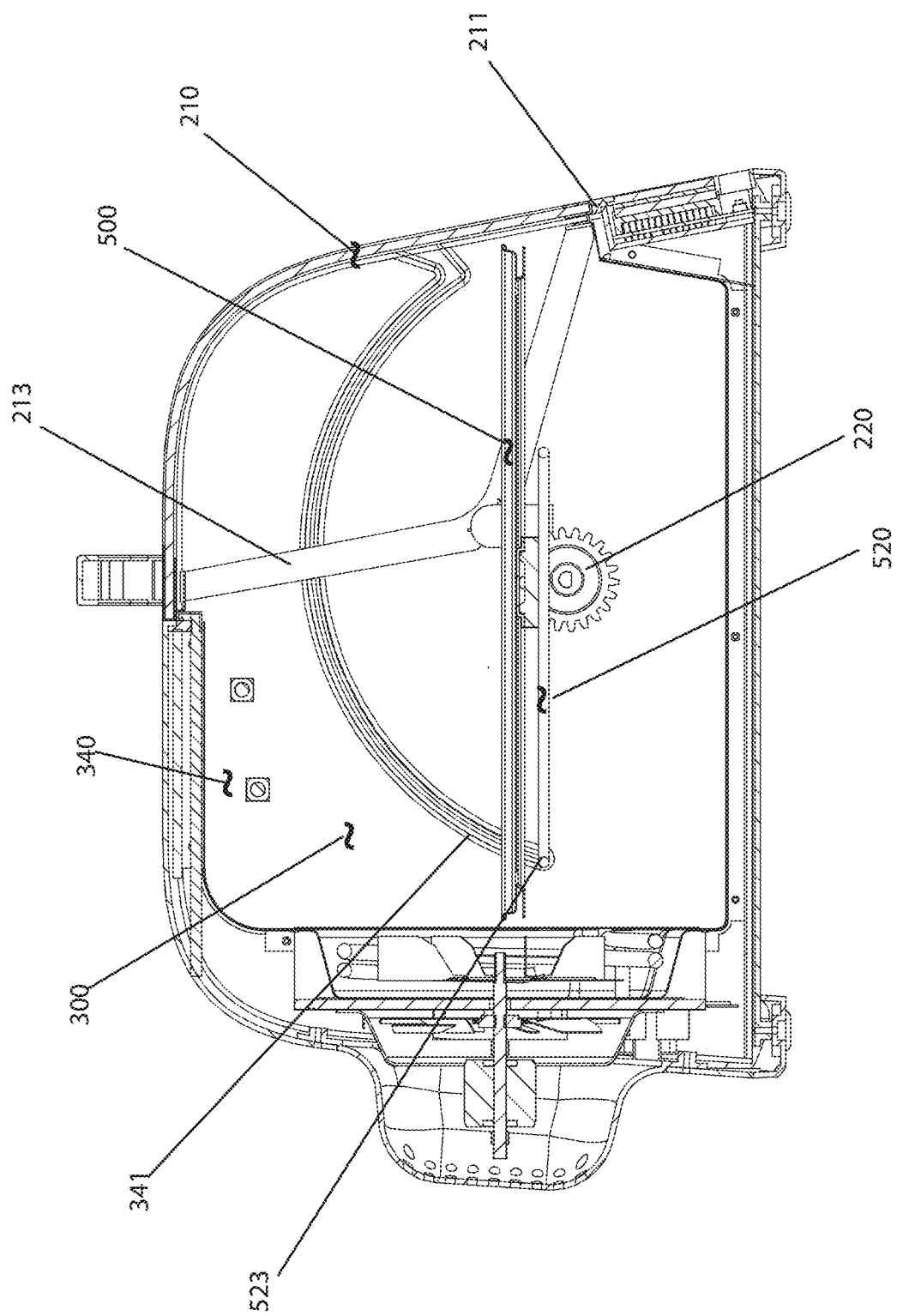

FIGS. 9A, 9B, 9C and 9D are cross sectional views through the countertop cooking appliances 100; they are provided to illustrate the movement of the platform 500 as the door 210 is gradually closes. In FIG. 9A the platform 500 and its support frame 520 are shown with their two sets of pins 521 and 523 (hidden) respectively placed in the track 341 of the side wall 340 of the cooking compartment 300 and on the hinged door bracket 213. FIGS. 9 B and C show the platform 500 with the door 210 progressively closing, and with the platform 500 remaining in a horizontal position, due to the shape of the track 341, having the same radius as defined by the hinge 211 and the location of the front set of pins 521, 522. FIG. 9D shows the hinged door 210 fully closed and the platform slotted ring 504 (not shown) engaging the drive gear 220 of the appliance 100.

Figure 10:
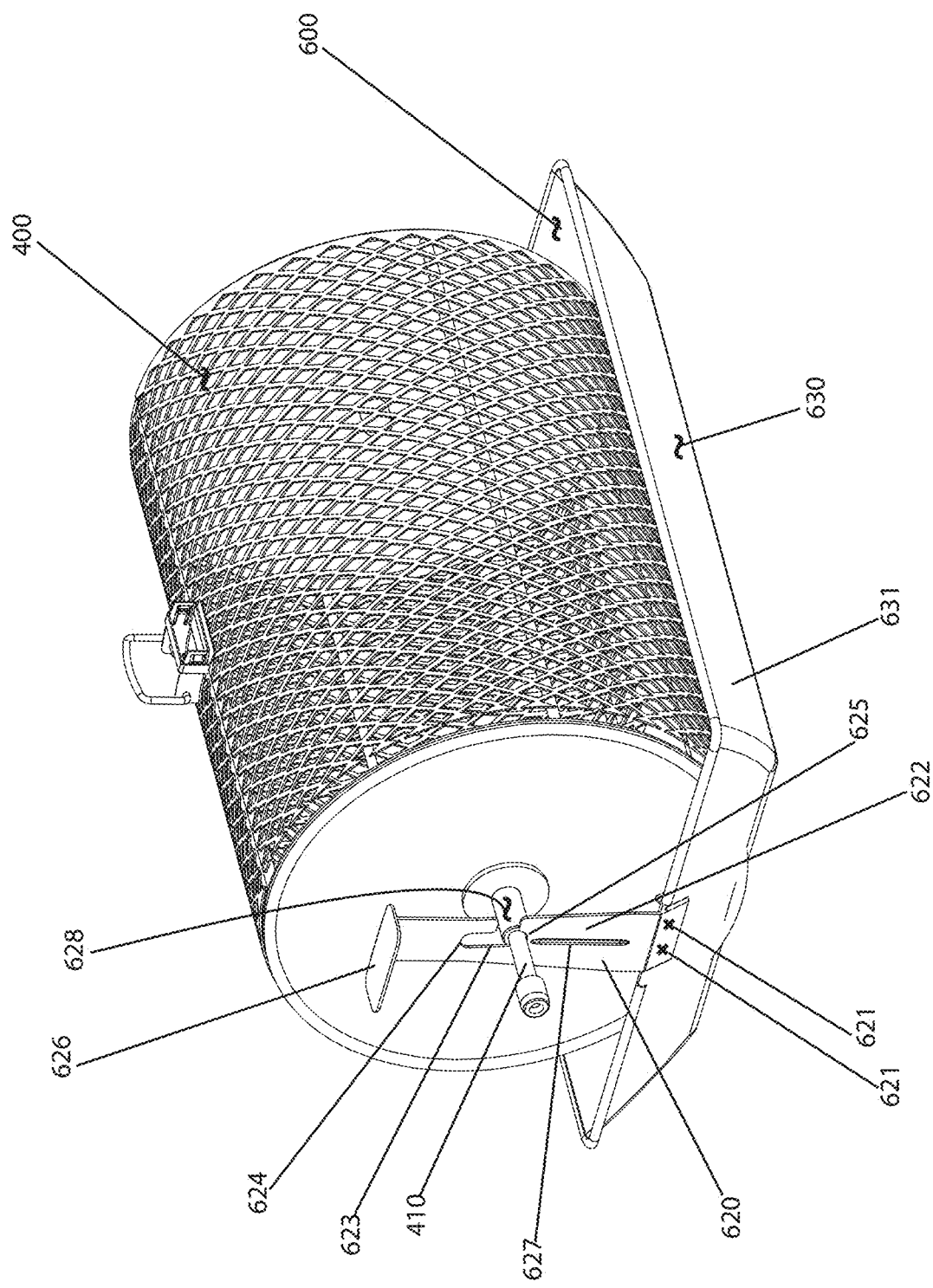
FIG. 10 is an isometric view of the cylindrical basket and the drip tray resting on a countertop after having been removed from the support structure integral to the hinged door of the appliance.

FIG. 10 is an isometric view of the drip pan 600 removed from the cooking appliance 100 and supporting the cylindrical basket 400. The drip pan 600 has a pan portion 630 with contiguous side wall 631 for containing a predetermined volume of drippings and fat being removed from chicken or other fowl during the roasting process. The pan has two support aims 610 (not visible) and 620 connected to the pan by spot welds 611 (not visible) and 621. Support arm 620 includes a vertical portion 622 with a stiffening rib 627. The vertical portion 622 features an elongated slot 623 with an upper end 624 and lower end 625 and with a side opening 628 through which the axle 410 of the cylindrical basket 400 can be slid in and out of engagement with the drip pan 600. When the drip pan 600 is suspended from the cylindrical basket 400 the axel 410 engages the upper end 624 of the slot 623. When the drip pan 600 is placed on a countertop, for placing or removing food from the basket 400 the axel 410 rests on the lower end 625 of the slot 623.

Figure 11:
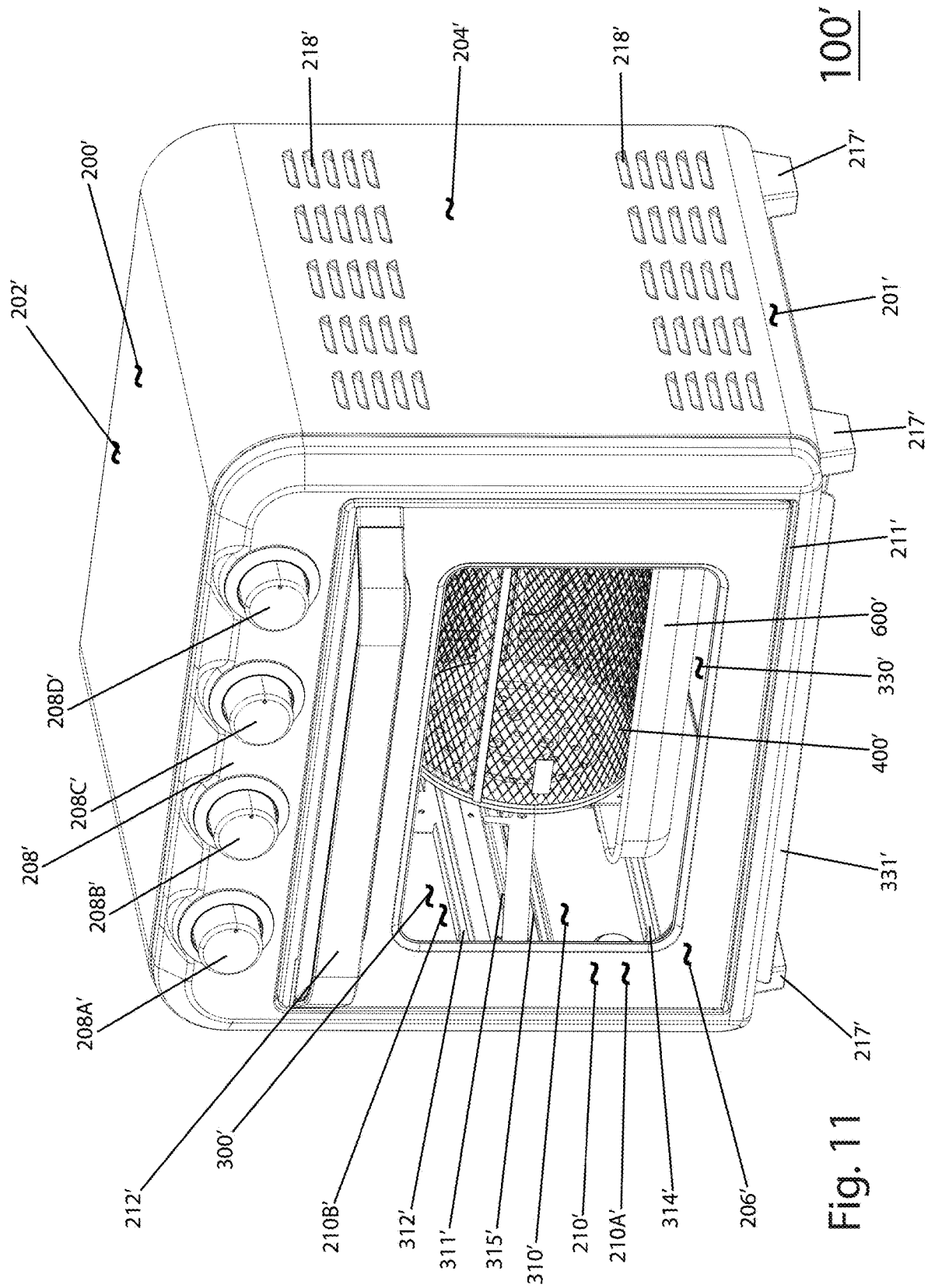
FIG. 11 is an isometric view of a countertop cooking appliance according to a second embodiment, with a rotatable cylindrical basket shown through the glass front door.
Figure 12:
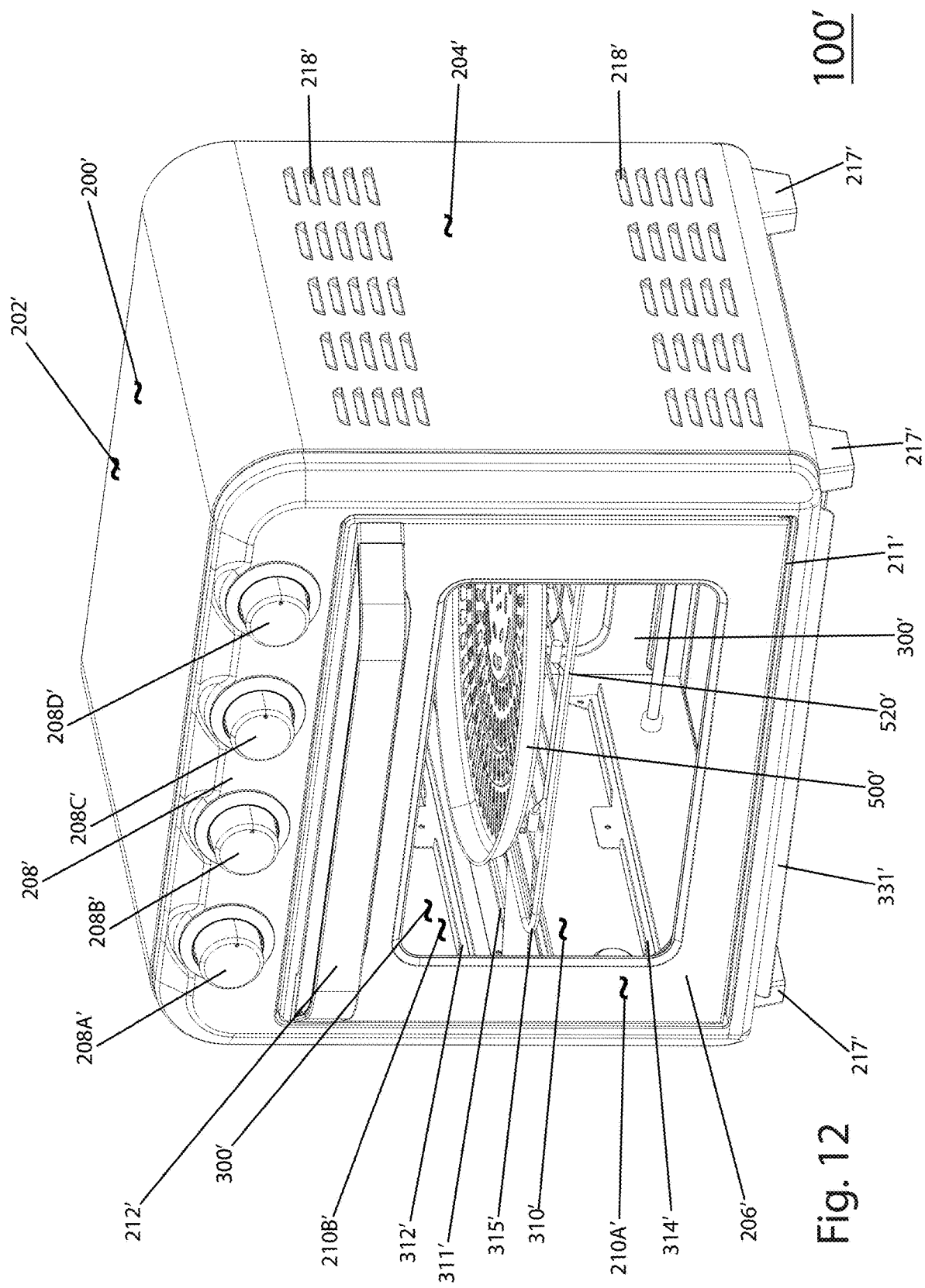
FIG. 12 is another isometric view of a countertop cooking appliance according to the invention, with a horizontal rotatable platform for supporting food stuff shown through the glass front door.

A second exemplary countertop cooking appliance 100' in accordance with and/or for use in practicing to the invention is shown as isometric views in FIG. 11 and FIG. 12. In particular, an outer enclosure 200' consists of a bottom 201' a top 202' a left side 203' (not shown) a right side 204', a rear 205' (not shown) and a front 206'. Also shown a hinged door 210', preferably partially or fully transparent, with a hinge 211' at its lower end and a handle 212' at its upper end. The hinged door 210' which may be made of a metal frame 210A' and contains a viewing portion made of glass or high temperature plastics 210B'. Also shown are electronic controls 208' consisting of a series of dials 208A,' 208B', 208C' and 208D'. Also shown feet 217', a multitude of vents 218' and the front of a removable crumb tray 331'.

Also visible through transparent door 210' in FIG. 11 are side wall 310' including tracks 311', 312', 314' and 315' and the bottom 330' of the cooking compartment 300' as well as rotatable cylindrical basket 400' and a drip tray 600'.

Also visible through transparent door 210' in FIG. 12 are side wall 310' including tracks 311', 312', 314' and 315', and the bottom 330' of the cooking compartment 300' as well as horizontal rotatable platform for supporting food stuff 500', and the wire rack 521' which supports it.

Figure 13:
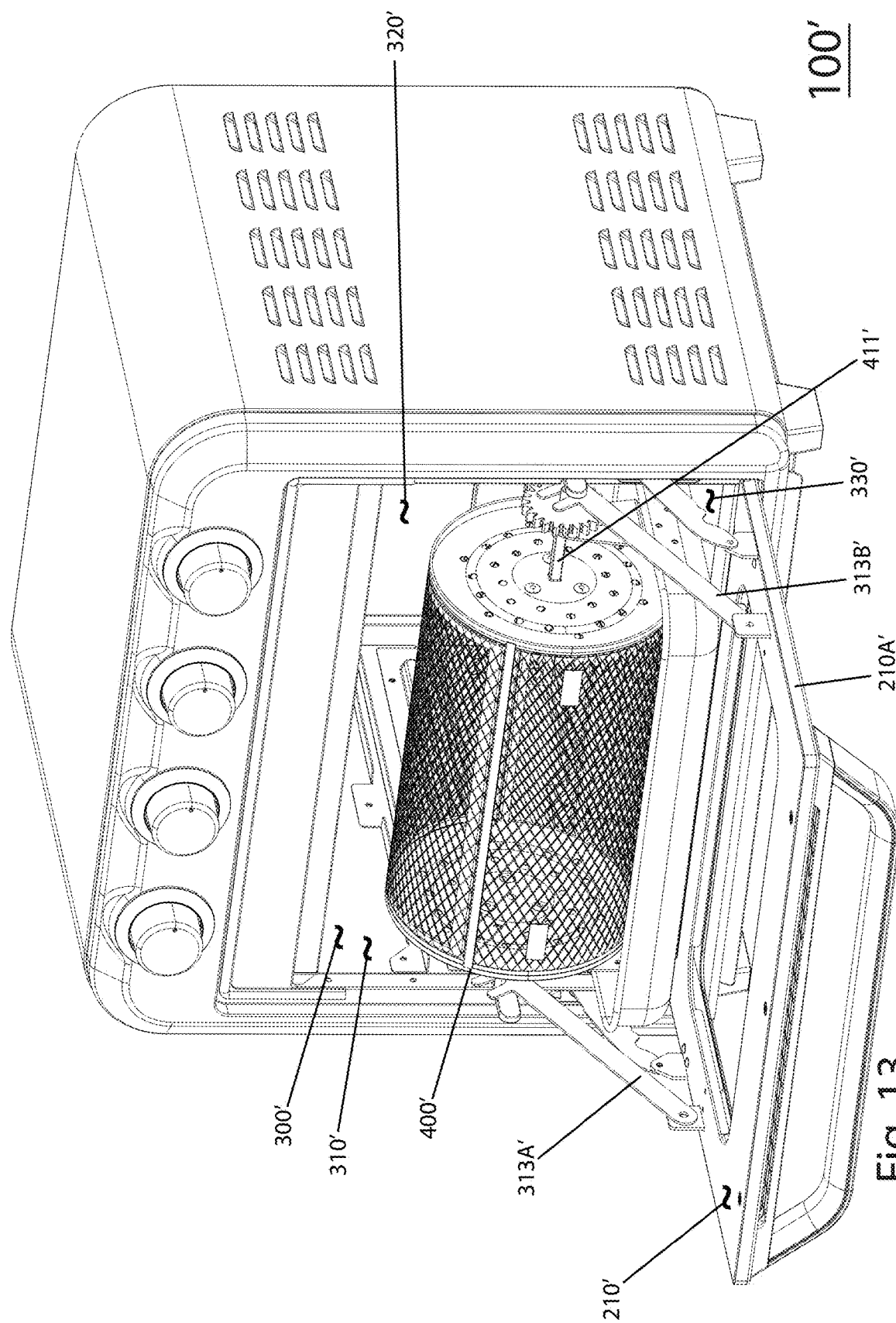
FIG. 13 is an isometric view of a countertop cooking appliance according to the invention, with the front door hinged open and a rotatable cylindrical basket shown outside the cooking compartment.

FIG. 13 is an isometric view of the countertop cooking appliance 100' with its door 210' hinged in an open position and a perforated cooking container 400' removably supported by its axels 410' and 411' (not visible) on brackets 213' and 214'. Also shown is drip tray 600' suspended from axels 410' and 411', which define horizontal axis 401'. Left side wall 310' shown incorporates tracks which are only partially shown and will be described in detail further along. Also shown is back wall 320' and bottom 330' of cooking compartment 300'. Also shown are brackets 313A' and 313B' hingeably connected to the door frame 210A' known in the art for limiting the travel of the hinged door.

Figure 14:
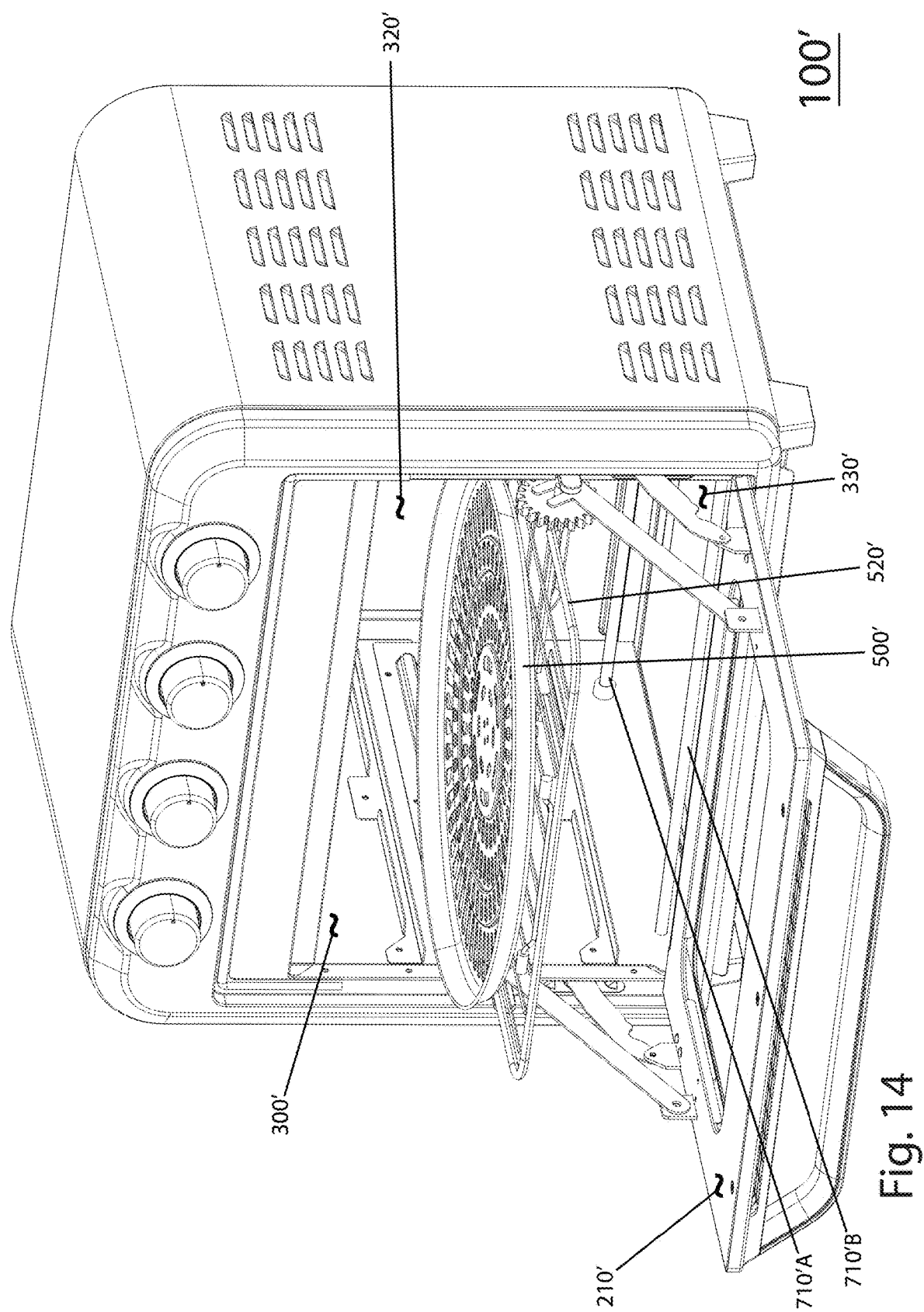
FIG. 14 is an isometric view of a countertop cooking appliance according to the invention, with the front door hinged open and rotatable platform for supporting food stuff shown outside the cooking compartment.

FIG. 14 is an isometric view of the countertop cooking appliance 100' with its door 210' hinged in an open position and a horizontal rotatable cooking platform 500' for supporting food stuff positioned on a frame 520', which in turn is removably supported by pins 521' and 522' on brackets 213' and 214'; also supported by its pins 523' and 524' (not visible) that may slide along tracks 311' (not visible) in left side wall 310' and 341' (not visible) in right side wall 340' (not visible). Also shown back wall 320' and bottom 330' of cooking compartment 300', as well as two bottom heating rods 710A' and 710B'.

Figure 15:
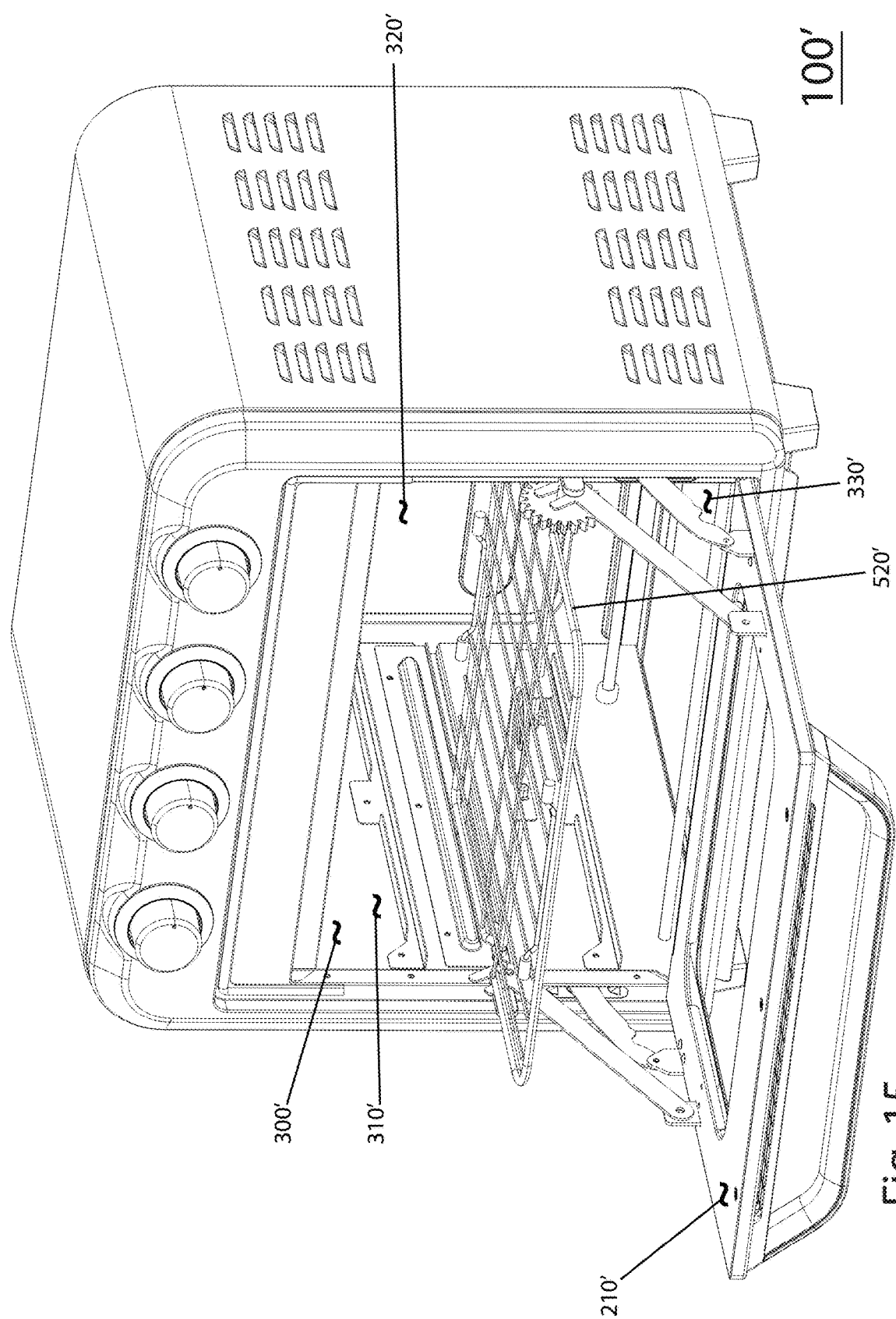
FIG. 15 is an isometric view of a countertop cooking appliance according to the invention, with the front door hinged open and a wire rack for supporting food stuff shown outside the cooking compartment.

FIG. 15 is an isometric view of the countertop cooking appliance 100' with its door 210' hinged in an open position and where the horizontal rotatable cooking platform 500' (not shown) for supporting food stuff is removed from the frame 520', where the user may use the frame for supporting slices of bread to be toasted by being exposed to both the two bottom heating rods 710A' and 710B' as well as the top heating rods 711A', 711B', 711C' and 711D' (not shown). Also shown side wall 310' which incorporates tracks which are only (partially shown and will be described in detail further along) back wall 320' and bottom 330' of cooking compartment 300'.

FIGS. 16 A, 16B, 16C and 16D are four views of a platform 500' and its support frame 520' used for supporting variety of food stuff to be cooked, while slowly turning about a vertical axis 501'. The platform 500' as shown is designed to support a pizza pie, exposing it to radiant and convective heat. The platform 500' which is removable from its support 520' includes the flat surface 507' with multiple apertures 502' surrounded by a raised rim 503'; attached to the underside of the flat surface is a gear 222' designed to mesh at a right angle with mating gear 223' mounted a on drive shaft 225' incorporating a gear 224' which is designed to mesh with drive gear 220' when the door is in its closed position for causing the platform to slowly turn about its vertical axis 501'. The gear 222' includes a center pin 504' which fits in an aperture 505' in the center of a plate 506' attached to the center of the support frame 520'. The aperture 505' in the plate 506' serve as a bearing so that the platform 500' can turn freely about vertical axis 501' common to the two parts. The pin 504' and the plate 506' can be separated for removal of the platform 500' from the frame 520' for cleaning or other purposes. The support frame 520' is made from a series of metal rods bent and welded together in a manner known in the art. The support frame 520' has two sets of outwardly projecting pins or rods, one set 523', 524' at the end of the frame closest to the back of the cooking compartment 300' and other set of pins comprising the distal end 521' of drive shaft 225' and the distal end of rod 522' permanently affixed to support frame 520'.The first set of outwardly projecting pins 523', 524' is designed to slide along the tracks 311' and 341' in the side walls 310' and 340' of the cooking compartment 300', whereas the second set of pins 521', 522' is designed to be supported on the two hinged door brackets 213', 214', that are hingeably connected at their one end to the door frame 210' in a manner known in the art and are hingeably connected at their second end to two blocks 510', 515' that slide in a track 315' in side wall 310' and track 345' in side wall 340'. Thus, when the door 210' is closed both sets of pins 521', 522' and 523', 524' will travel on parallel tracks to ensure that as the platform 500' remains securely balanced as it travels in and out of the cooking compartment 300'. The drive shaft 225' incorporating a gear 224' is positioned on the support frame 520' so that gear 224' will mesh with drive gear 220' when the door 210' is in its closed position.

In order to help support the 500' the support frame 520' includes two sets each of two Teflon sleeves 525' affixed to two bent metal rods 526'.

Figure 17A:
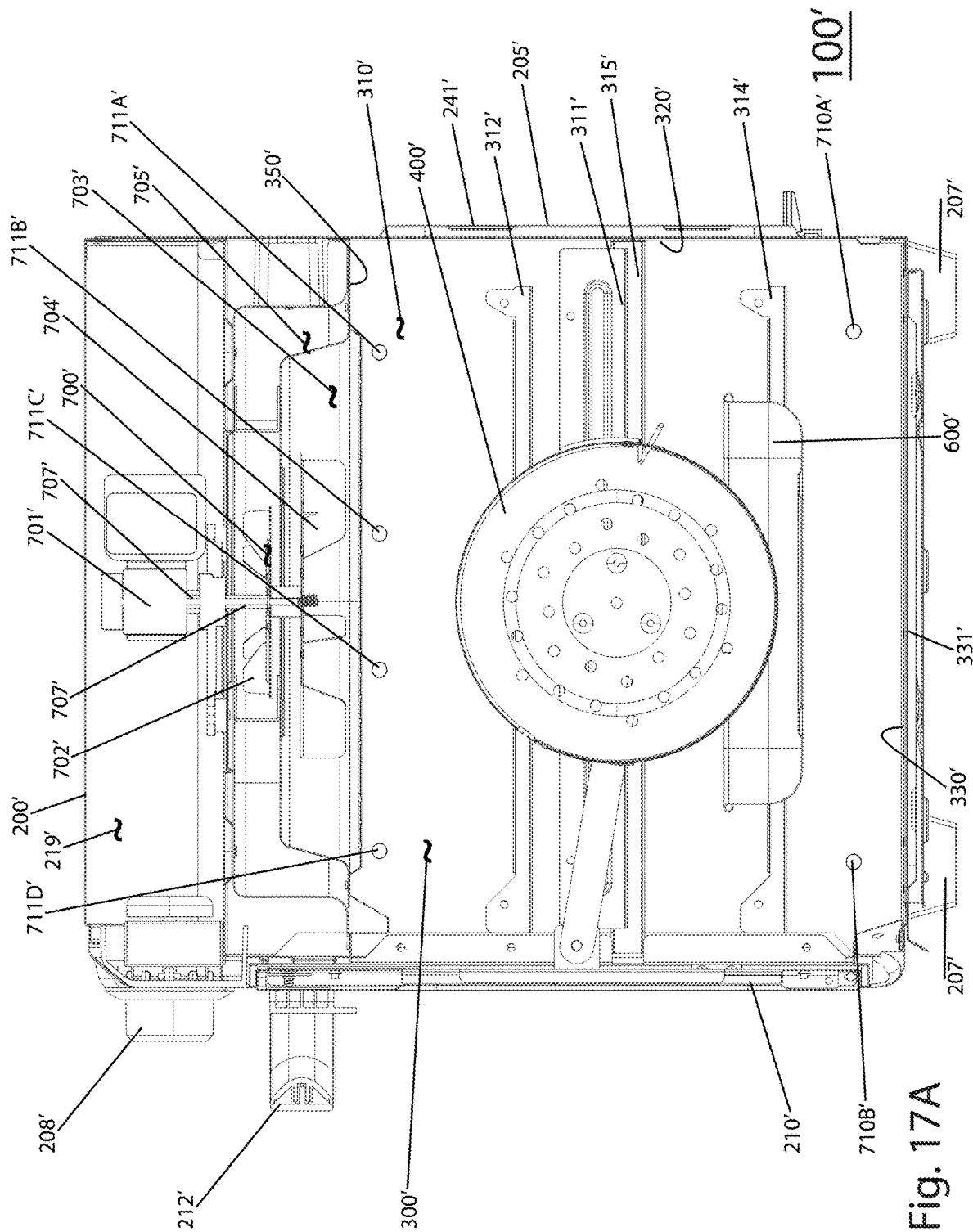
FIG. 17A is a cross sectional view of the countertop cooking appliances taken along the lines 7-7 of FIG. 11.

FIG. 17A is a cross sectional views of the countertop cooking appliance 100' with the hinged door 210' closed and the cylindrical basket 400' in position where its gear 221' (not shown) engages the drive gear 220' (not shown) of the appliance, also shown is the drip tray 600' suspended from the axles of the cylindrical basket 410' and 411' (not shown). FIG. 17A also shows the four tracks 311' 312' 314' and 315' on the side wall 310' which will be described in greater detail further down. Also shown are the two bottom heating rods 710A', 710B', as well as the four heating elements 711A', 711B', 711C' and 711D' located near the top of the cooking compartment 300'. Also shown is the convective heating assembly 700' with a motor 701', a cowl 703' communicating with the cooking compartment 300' and containing a convection fan 704' mounted on and driven by the motor shaft 707' of motor 701'. Also shown is a compartment 705' surrounding the cowl 703' for shielding the plenum 219' from the high temperature found in the cowl. The compartment 705' includes a motor cooling fan 702' mounted on and driven by the motor shaft 707' of motor 701'. Also shown is the hinged door 210' with its handle 212', electronic controls 208' on the front upper portion of the appliance. As well as the bottom wall 330' rear wall 320' and top wall 350' of the cooking compartment 300', the crumb tray 331', a bump-out 241' in the rear portion of the outer wall 205' of the appliance designed to accommodate the horizontal rotatable cooking platform 500' spaced apart from the walls of the cooking compartment 300' to maintain the outer enclosure 200' cool to the touch. Also shown are two of the four support feet 207' to keep the appliance off the kitchen counter, and a bumper 209' to keep the appliance off the kitchen back wall.

FIG. 17B shows the same cross section as FIG. 17A, except that the hinged door 210' is shown in its open position with the cylindrical basket 400' partially outside the oven for easy removal by the user. The drip tray 600' is shown positioned underneath the cylindrical basket 400' so that any drippings would be contained and not mar the glass door.

Figure 18:
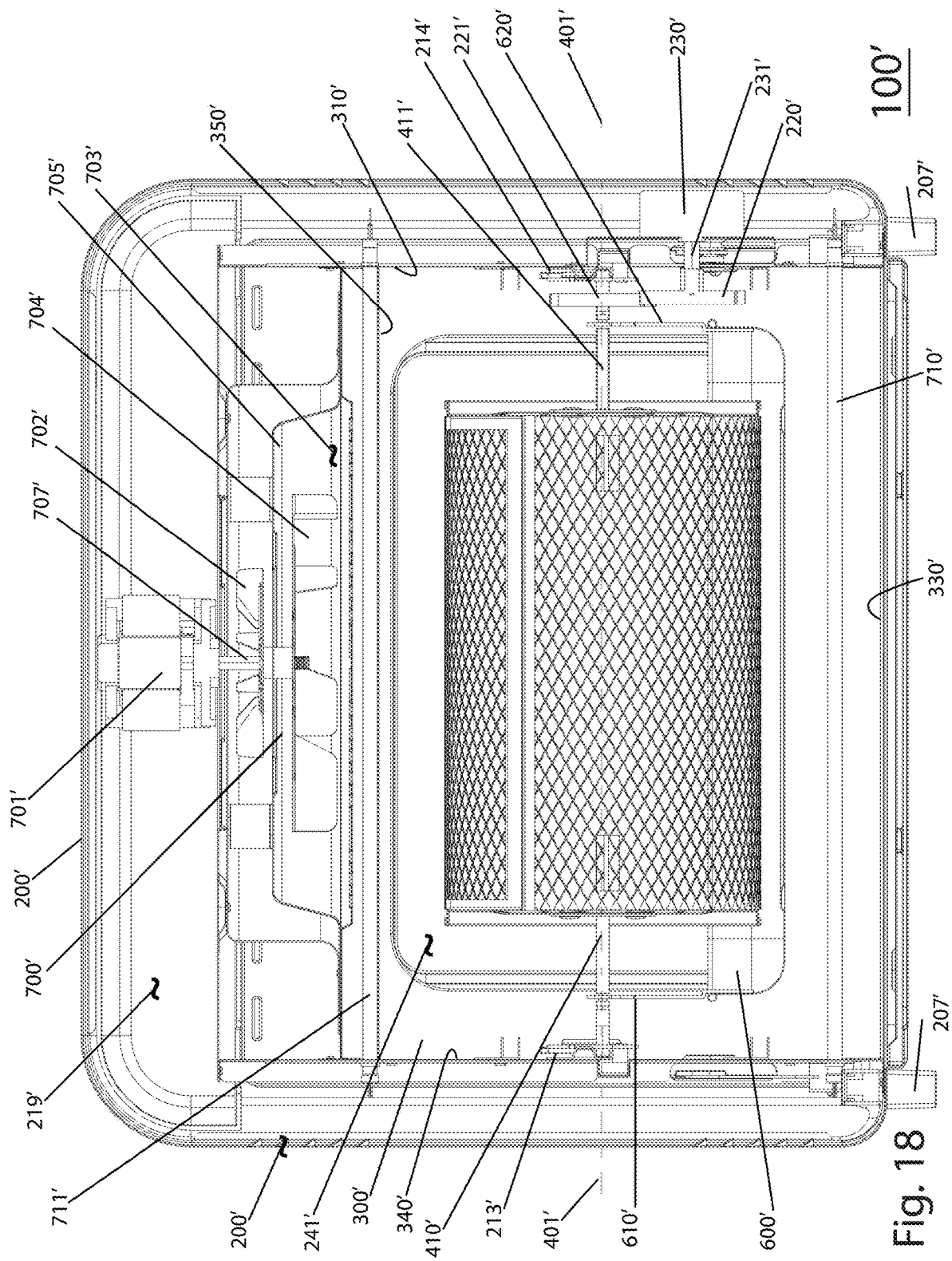
FIG. 18 is a cross sectional view of the countertop cooking appliances taken along the lines 8-8 of FIG. 11.

FIG. 18 is a frontal cross sectional view of the countertop cooking appliance 100' showing the cylindrical basket axles 410', 411' supported on the door brackets 213', 214', with the drip tray 600' suspended from the axles 410', 411' by its two side brackets 610' and 620'. Also shown is the gear motor 230' located in the space between the outer enclosure 200' and the cooking compartment 300' with its shaft 231' penetrating through side wall 310', the shaft 231' terminating in a gear 220' shown in engagement with the axle gear 221' of the cylindrical basket 400'. Also shown is one of the bottom heater rods 710' well as one of the heating rods 711' located near the top of the cooking compartment 300'. Also shown is the convective heating assembly 700' with a motor 701', a cowl 703' communicating with the cooking compartment 300' and containing a convection fan 704' mounted on and driven by the motor shaft 707' of motor 701'. Also shown is a compartment 705' surrounding the cowl 703' for shielding the plenum 219' from the high temperature found in the cowl. The compartment 705' includes a motor cooling fan 702' mounted on and driven by the motor shaft 707' of motor 701'. Also shown are the top 350' and bottom 330' as well as side walls 310', 340' of the cooking compartment 300' and the outer enclosure 200' of the appliance, with the bump-out portion 241'. Also shown are two of the four support feet 207'.

Figure 19B:
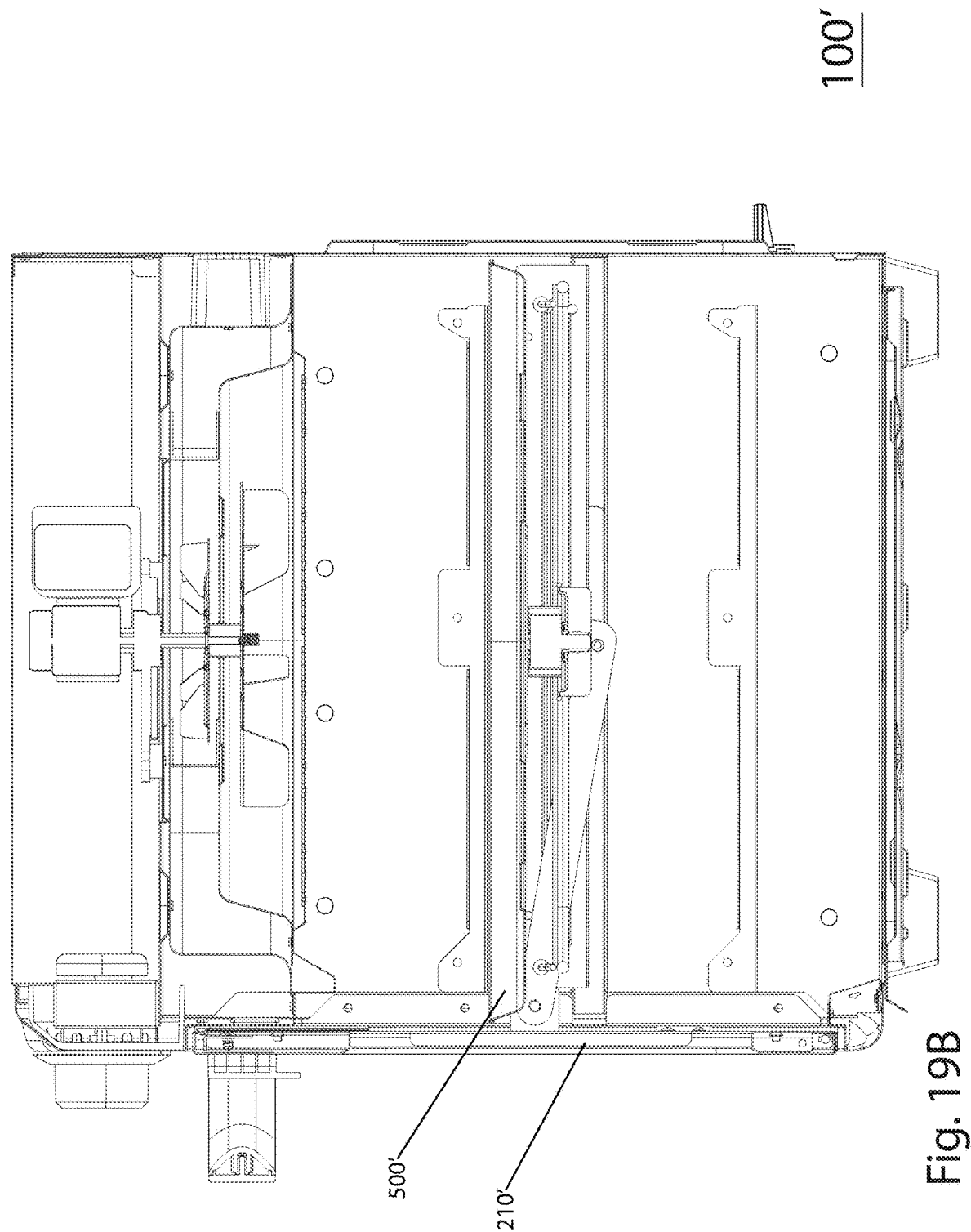
FIG. 19B is a cross sectional view of the countertop cooking appliances taken along the lines 7-7 of FIG. 14.

FIGS. 19A and 19B, are cross sectional views through the countertop cooking appliances 100'. These are provided to illustrate the movement of the platform 500' in relationship to the position of the door 210'.

FIG. 19A shows the hinged door 210' fully open and the platform 500' partially outside the oven for easy removal by the user, and its support frame 520' is shown with their one set of pins one set 523', 524' (hidden) respectively placed in the track 341' of the side wall 340' of the cooking compartment 300', and the second set of pins 521', 522' (not shown) are supported on the two hinged door brackets 213', 214', that are hingeably connected at their one end to the door frame 210' in a manner known in the art and are hingeably connected at their second end to two blocks 510' and 515 (not shown) that slide in a track 315' in side wall 310' and track 345' in side wall 340'.

FIG. 19B shows the hinged door 210' fully closed and the gear 224' (not shown) engaging the drive gear 220' (not shown) of the appliance 100'.

To facilitate a clear view of the door, the support brackets and the tracks in the side wall 310'. FIGS. 20A and 20B are side cross-sectional views through the countertop cooking appliances 100' with the cylindrical basket 400', and the rotatable cooking platform 500' for supporting food stuff and its frame 520' removed. It can be seen that door bracket 213' is hingeably connected at one end to the door frame and is hingeably connected to the sliding block 510', thus, as the door 210' turns about its hinges 211A' and 211B' the brackets 213A' and 213B' will cause blocks 510' and 515' to slide backwards in their tracks 315' and 345'. tracks 312' and 314' are provided for the user to place conventional rack in the oven, without requiring rotating the food support platform or basket.

Clearer details of the bracket 213' and the block 510' and the track 315' can be seen in FIGS. 20C and 20D. the bracket 213' includes the two hinge points 214' an elongated arm portion 215' and a yoke 216' for receiving axel 410', when the basket 400' is in use, or receiving pin 521' when the food supporting platform 500' is in use. Track 313' is designed for pin 523' of frame 520' to slide back and forth, to ensure that frame 210' is stabilized by all its four pins travelling in a horizontal plane.

FIG. 20E being a cross sectional view along line 20-20 in FIG. 20C shows how the tracks 311', 312', 314' and 315' are designed and how they are integrated with the side wall 310'. Track 311' and 315' are formed by bending a metal strip to form a C shaped channel intended to support standard racks, as known in the art, and are not used to support either the basket 400', or the supporting platform 500' which are subject matter addressed in this disclosure. Track 314' is formed as a horizontal, elongated depression in side-wall 310', and is designed to contain the block 510'. A mirror image track 344' containing block 515' (not shown) is located on wall 340'. Tracks 314' and 344' are partially covered by elongated bent steel brackets 316' and 346' (not shown) in order to prevent blocks 510' and 515' from falling out. As can be seen in the cross section of bracket 316' it comprises a flat portion 317' flush with wall 310' and attached to it in a manner known in the art (screws, rivets or spot welding); also shown is its raised portion 318' and a right angle flange 319'. A track 312' is thus established between the raised portion and the flange. The block 510' comprises a rectangular main body 511', a post 512' integral to main body and a screw 513' used to hingeably connect to the door bracket 213'. Hence, as the door is closed or opened the bracket 213' which is also hingeably connected to the door will push or pull the block along its track, ensuring that the pin or axel supported in the bracket yoke 216' (not shown) travels in a horizontal plane.

While inventive aspects of the invention will be appreciated from the detailed description and drawings. It should be understood that although the invention has been demonstrated by reference to exemplary embodiments including alternative variations thereto, aspects of the invention are not limited to the embodiments described. Also, aspects of the invention may be used alone, or in any suitable combination with other aspects of the invention. Therefore, the invention should only be limited according to the following claims, including all equivalent interpretation entitled thereto.

I claim:

1. A countertop cooking appliance comprising:
    a cooking compartment having an inner chamber adapted to receive, one at a time, a first food holder and a second food holder, and having at least one source to generate heat within the inner chamber;
    a driver adapted for causing rotation within the inner chamber about a horizontal axis;
    the first food holder having a first horizontal axle fixed thereto and projecting outwardly therefrom and connectable to the driver and rotatable thereby about the horizontal axis to rotate the first horizontal axle and the first food holder within the inner chamber and uniformly expose food held by the first food holder to the at least one source;
    the second food holder having a second horizontal axle rotational relative thereto and projecting outwardly from opposite sides thereof and connectable to the driver and rotatable thereby about the horizontal axis, and having a vertical axle fixed thereto and rotationally connected to the second horizontal axle and rotatable thereby about a vertical axis to rotate the vertical axle and the second food holder and uniformly expose food held by the second food holder to the at least one source.

2. The countertop cooking appliance of claim 1 further comprising a door having an open position for exposing the inner chamber and a closed position for enclosing the inner chamber;
    a food holder support comprising a pair of arms linked to the door and movable therewith, each arm comprising a yoke adapted to;
        receive, one at a time, a selected one of the first and second horizontal axles in a first location outside the inner chamber when the door is in the open position;
        shuttle the selected one from the first location into the inner chamber and into connection with the driver when the door is moved to the closed position; and
        shuttle the selected one back to the first location outside the inner chamber when the door is moved back to the open position, where the selected one can be removed from the food holder support.

3. The countertop cooking appliance of claim 2 wherein the first and second horizontal axles each extend from opposite sides of the associated food holder to be received within the yokes.

4. The countertop cooking appliance of claim 3 wherein the inner chamber further comprises horizontal guides, and the second food holder further comprises a horizontal rod parallel to the second horizontal axle and extending from opposite sides of the second food holder support into and engageable within the guides when the second food holder is within the inner chamber to prevent horizontal rotation of the second food holder.

5. The countertop cooking appliance of claim 4 wherein the first food holder comprises a cylindrical food basket and rotation of the first food holder within the cooking compartment comprises rotation of the cylindrical food basket about the horizontal axis for uniform exposure of the food therein to the at least one source of heat.

6. The countertop cooking appliance of claim 5 wherein the first food holder further comprises a drip tray engaging the cylindrical food basket and pivotable relative thereto about the horizontal axis such that the drip tray is always positioned underneath the cylindrical food basket for collecting drippings from the food.

7. The countertop cooking appliance of claim 6 wherein the drip tray is adapted to support the cylindrical food basket when removed from the appliance and set upon a horizontal surface.

8. The countertop cooking appliance of claim 4 wherein the second food holder is a planar food tray and rotation of the second food holder within the inner chamber comprises rotation of the planar food tray about the vertical axis for uniform exposure of the food held thereby to the at least one source of heat.

9. The countertop cooking appliance of claim 8 wherein the horizontal guides engage the horizontal rod as the second food holder enters the inner chamber to maintain the planar food tray in a horizontal disposition.

10. The countertop cooking appliance of claim 9 wherein the horizontal guides comprises a pair of guide channels, each disposed on an opposite sidewall of the inner chamber.

11. The countertop cooking appliance of claim 2 wherein the first food holder comprises a cylindrical food basket and rotation of the first food holder within the cooking compartment comprises rotation of the cylindrical food basket about the horizontal axis for uniform exposure of the food therein to the at least one source of heat.

12. The countertop cooking appliance of claim 3 wherein the first food holder comprises a cylindrical food basket and rotation of the first food holder within the cooking compartment comprises rotation of the cylindrical food basket about the horizontal axis for uniform exposure of the food therein to the at least one source of heat.

13. The countertop cooking appliance of claim 1 wherein the first food holder comprises a cylindrical food basket and rotation of the first food holder within the cooking compartment comprises rotation of the cylindrical food basket about the horizontal axis for uniform exposure of the food therein to the at least one source of heat.

14. The countertop cooking appliance of claim 13 wherein the first food holder further comprises a drip tray engaging the cylindrical food basket and pivotable relative thereto about the horizontal axis such that the drip tray is always positioned underneath the cylindrical food basket for collecting drippings from the food.

15. The countertop cooking appliance of claim 14 wherein the drip tray is adapted to support the cylindrical food basket when removed from the appliance and set upon a horizontal surface.

16. The countertop cooking appliance of claim 14 wherein the drip tray is adapted to support the cylindrical food basket when removed from the appliance and set upon a horizontal surface.

17. The countertop cooking appliance of claim 14 wherein the drip tray is adapted to support the cylindrical food basket when removed from the appliance and set upon a horizontal surface.

18. The countertop cooking appliance of claim 1 wherein the first food holder further comprises a drip tray engaging the cylindrical food basket and pivotable relative thereto about the horizontal axis such that the drip tray is always positioned underneath the cylindrical food basket for collecting drippings from the food.

19. The countertop cooking appliance of claim 1 wherein the first food holder further comprises a drip tray engaging the cylindrical food basket and pivotable relative thereto about the horizontal axis such that the drip tray is always positioned underneath the cylindrical food basket for collecting drippings from the food.

* * * * *